United States Patent
Braun et al.

(10) Patent No.: US 12,092,595 B2
(45) Date of Patent: Sep. 17, 2024

(54) STEADY-STATE THERMO-REFLECTANCE METHOD AND SYSTEM TO MEASURE THERMAL CONDUCTIVITY

(71) Applicant: UNIVERSITY OF VIRGINIA PATENT FOUNDATION, Charlottesville, VA (US)

(72) Inventors: Jeffrey L. Braun, Charlottesville, VA (US); David H. Olson, Charlottesville, VA (US); John T. Gaskins, Charlottesville, VA (US); Patrick E. Hopkins, Charlottesville, VA (US)

(73) Assignee: UNIVERSITY OF VIRGINIA PATENT FOUNDATION, Charlottesville, VA (US)

( * ) Notice: Subject to any disclaimer, the term of this patent is extended or adjusted under 35 U.S.C. 154(b) by 304 days.

(21) Appl. No.: 17/272,011

(22) PCT Filed: Aug. 28, 2019

(86) PCT No.: PCT/US2019/048505
§ 371 (c)(1),
(2) Date: Feb. 26, 2021

(87) PCT Pub. No.: WO2020/047054
PCT Pub. Date: Mar. 5, 2020

(65) Prior Publication Data
US 2022/0146443 A1    May 12, 2022

Related U.S. Application Data

(60) Provisional application No. 62/860,949, filed on Jun. 13, 2019, provisional application No. 62/723,750, filed on Aug. 28, 2018.

(51) Int. Cl.
*G01N 25/18* (2006.01)
*G01N 21/17* (2006.01)
(Continued)

(52) U.S. Cl.
CPC ......... *G01N 25/18* (2013.01); *G01N 21/1717* (2013.01); *G01N 21/55* (2013.01); *G01N 25/20* (2013.01); *G01N 2021/1731* (2013.01)

(58) Field of Classification Search
CPC .... G01N 25/18; G01N 21/1717; G01N 21/55; G01N 25/20; G01N 2021/1731
See application file for complete search history.

(56) References Cited

U.S. PATENT DOCUMENTS

| | | |
|---|---|---|
| 5,667,300 A | 9/1997 | Mandelis et al. |
| 6,054,868 A | 4/2000 | Borden et al. |

(Continued)

FOREIGN PATENT DOCUMENTS

| | | | |
|---|---|---|---|
| CN | 204405576 U | | 6/2015 |
| CN | 107478582 A | * | 12/2017 |

(Continued)

OTHER PUBLICATIONS

International Search Report and Written Opinion dated Nov. 11, 2019 in related International Application No. PCT/US2019/048505.

(Continued)

*Primary Examiner* — Mirellys Jagan
(74) *Attorney, Agent, or Firm* — Schwegman Lundberg & Woessner, P.A.

(57) ABSTRACT

A method of measuring thermal conductivity of a material includes focusing a modulated pump laser beam having a modulation frequency that induces a cyclical steady-state temperature rise at a spot of a material, focusing a CW probe laser beam at the spot and generating a reflected probe beam reflected from the spot on the material, the reflected probe beam having a magnitude of a reflectance signal as a function of the temperature of the material and being periodic corresponding to the cyclical temperature rise, measuring the magnitude of the reflectance signals of the reflected (Continued)

probe beam, and determining the thermal conductivity by fitting the power of the pump beam and the measured magnitude of the reflectance signal to a thermal model which is a function of a thermal conductivity of the material relating the radial heat flux to the temperature rise.

15 Claims, 15 Drawing Sheets

(51) Int. Cl.
*G01N 21/55* (2014.01)
*G01N 25/20* (2006.01)

(56) References Cited

U.S. PATENT DOCUMENTS

| 9,927,350 | B2* | 3/2018 | Schmidt | G01N 21/55 |
|---|---|---|---|---|
| 2006/0222043 | A1* | 10/2006 | Cahill | G01N 25/18 |
| | | | | 374/44 |
| 2018/0128759 | A1* | 5/2018 | Hurley | G01N 25/18 |

FOREIGN PATENT DOCUMENTS

| JP | H0476446 | A | 3/1992 |
|---|---|---|---|
| JP | 2002517750 | A | 6/2002 |
| JP | 2010160590 | A | 7/2010 |
| JP | 2010243482 | A | 10/2010 |
| JP | 2022500624 | A | 1/2022 |
| KR | 20210048539 | A | 5/2021 |
| WO | WO-2020047054 | A1 | 3/2020 |

OTHER PUBLICATIONS

Unm Digital Repository, et al, "University of New Mexico Thermoreflectance Technique for Thermal Properties Measurement of Micro/Nanoscale Cantilever Beams", Retrieved from the Internet: URL:https://pdfs.semanticscholar.org/c8d2/d7a9caa2d5f25e459c5871 b9db61 fbd611 cc.pdf, May 1, 2017.

Dongliang Zhao, et al, "Measurement Techniques for Thermal Conductivity and Interfacial Thermal Conductance of Bulk and Thin Film Materials", Journal of Electronic Packaging, vol. 138, No. 4, Oct. 6, 2016, p. 040802.

Yazawa Kazuak, et al, "Optical Pump-Probe Thermoreflectance Imaging for Anisotropic Heat Diffusion", 2018 17th IEEE Intersociety Conference on Thermal and Thermomechanical Phenomena in Electronic Systems (Itherm), IEEE, May 29, 2018, pp. 59-66.

Braun, Jeffrey L et al: Upper limit to the thermal penetration depth during modulated heating of multilayer thin films with pulsed and continuous wave lasers: A numerical study, Journal of Applied Physics, American Institute of Physics, 2 Huntington Quadrangle, Melville, NY 11747, vol. 121, No. 17, May 5, 2017, XP012218646, ISSN: 0021-8979, DOI: 10.1063/1.4982915.

Office action dated Feb. 10, 2023 in related European Patent Application No. 19769283.3 filed Aug. 28, 2019.

"International Application Serial No. PCT/US2019/048505, International Preliminary Report on Patentability mailed Mar. 11, 2021", 9 pgs.

"Japanese Application Serial No. 2021-510838, Notification of Reasons for Refusal mailed Jul. 11, 2023", w/ English Translation, 9 pgs.

Miyake, Shugo, "Thermal conductivity measurement technique for Cu—Pt alloy thin films by a modulated thermoreflectance method", The journal of the Japan Institute of Metals and Materials, vol. 73, No. 6 Japan, 434-438, w/Machine Translation.

"Japanese Application Serial No. 2021-510838, Response filed Jan. 10, 2024 to Notification of Reasons for Refusal mailed Jul. 11, 2023", w/ English claims, 17 pgs.

* cited by examiner

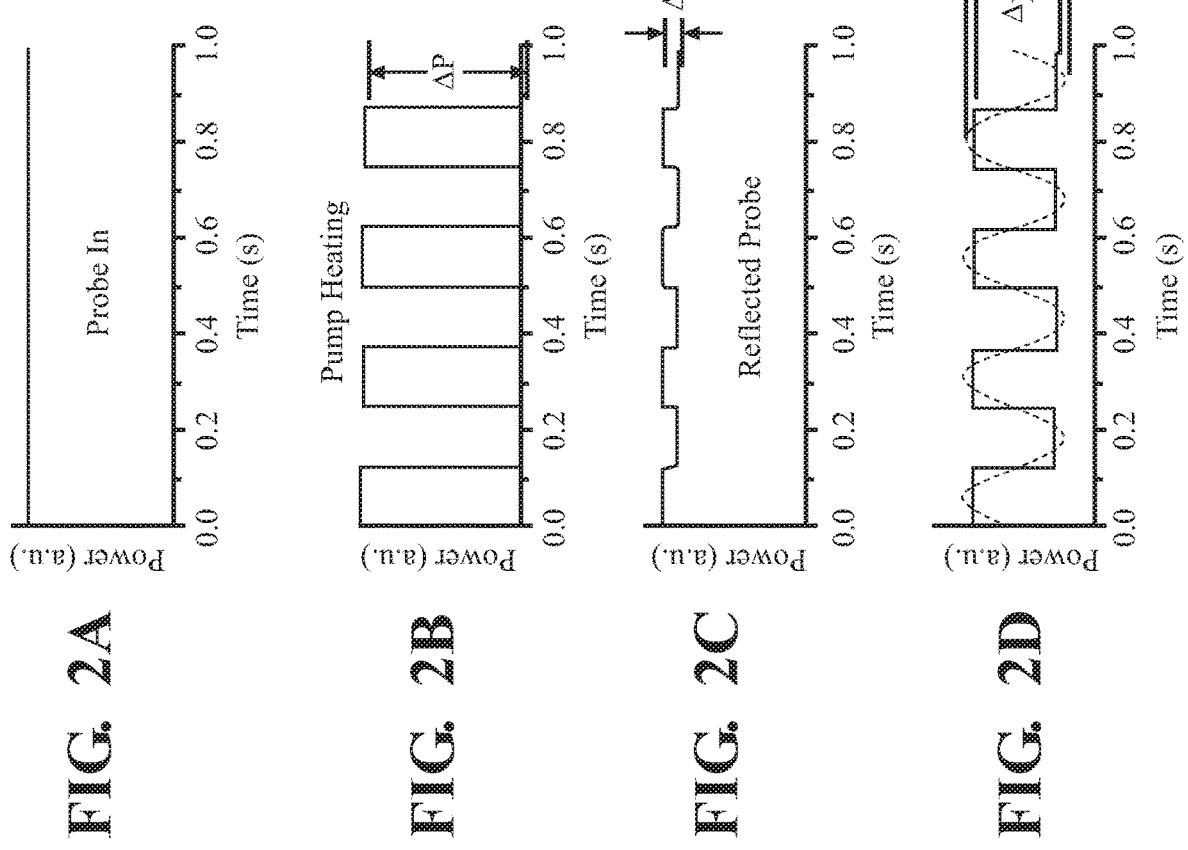

FIG. 11A
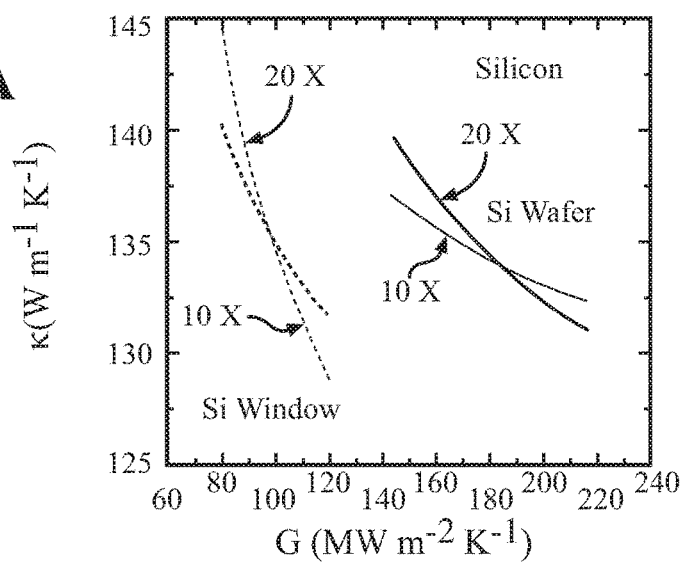
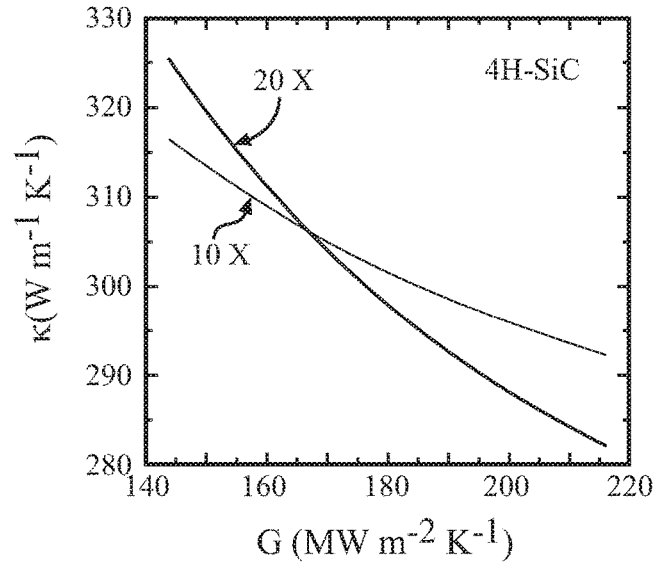
FIG. 11B
FIG. 11C
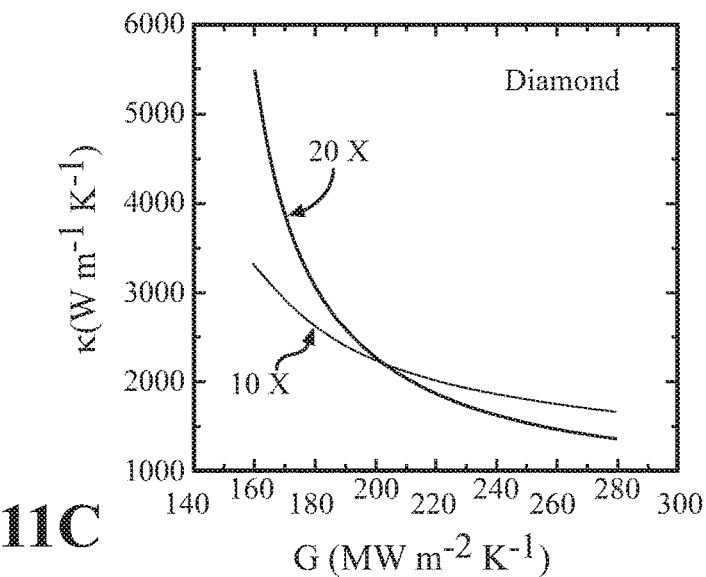

STEADY-STATE THERMO-REFLECTANCE METHOD AND SYSTEM TO MEASURE THERMAL CONDUCTIVITY

REFERENCES TO RELATED APPLICATIONS

This application is a National Phase Application of International Application No. PCT/US2019/048505, filed on Aug. 28, 2019 and claims the benefit of U.S. Provisional Patent Application Ser. No. 62/723,750 filed Aug. 28, 2018, and claims the benefit of U.S. Provisional Patent Application Ser. No. 62/860,949, filed Jun. 13, 2019, the entire contents of which are incorporated herein by reference.

GOVERNMENT SUPPORT

This invention was made with government support under contract number N00014-15-12769 awarded by The Department of Defense. The government has certain rights in the invention.

FIELD OF THE INVENTION

The present invention relates to measurement of thermal conductivity, in particular, using thermoreflectance based optical pump-probe techniques.

BACKGROUND OF THE INVENTION

Measurement techniques used to characterize the thermal conductivity ($\kappa$) of materials can be broadly categorized into steady-state and transient techniques. The former, based on Fourier's law, allow for direct measurements of thermal conductivity, whereas the latter rely on the heat diffusion equation such that volumetric heat capacity and thermal conductivity are coupled through the thermal effusivity or thermal diffusivity, depending on the time and length scales of the measurement. Some examples of transient techniques include transient hot-wire, transient plane source, the 3 $\omega$ method, and non-contact pump-probe techniques such as laser flash, time-domain thermoreflectance (TDTR) and frequency-domain thermoreflectance (FDTR). The 3$\omega$ method, TDTR, and FDTR have proven to be robust techniques capable of measuring thermal properties of both bulk and thin film materials. TDTR and FDTR, specifically, have the advantage of being non-contact techniques requiring a very small experimental surface area to heat. However, these techniques can be expensive and difficult to operate, as they generally require detection of the phase shift of a signal that needs to be separated from instrument electronic phase shifts, along with additional knowledge of the heat capacity of the material under study.

Steady-state techniques include the absolute technique, comparative cut bar technique, radial heat flow method, and the parallel thermal conductance technique. Zhao et al. provide an extensive review of these techniques. While these techniques are straightforward and require only variations of Fourier's law to analyze experimental data, they have practical limitations that make them undesirable compared to the aforementioned transient techniques. For example, all of these techniques are designed for bulk materials, so they require relatively large experimental volumes and heater/sensor areas. This makes them highly susceptible to radiative and convective losses, often necessitating vacuum conditions during measurements. Moreover, techniques requiring contact between a sensor and sample generally include the undesired artifact of contact thermal resistance that can obscure the measurement of intrinsic thermal conductivity. Additionally, they can require waiting times up to several hours to reach steady-state temperatures. Finally, these techniques fundamentally measure the thermal conductance across a bulk specimen, rather than within a locally probed area as has been shown in FTDR and TDTR.

SUMMARY OF THE INVENTION

The present invention provides embodiments of a method and system for measuring thermal conductivity using a steady-state thermoreflectance (SSTR) based optical pump-probe technique.

The concept is to modulate a continuous wave (CW) heat source laser with a periodic waveform at a modulation frequency to cycle the temperature rise on and off. The modulation frequency may be low enough that the pump laser is left on long enough to induce a steady-state temperature rise in the material during each cycle. By cycling the steady-state temperature rise on and off, a probe beam can be used to detect the resulting reflectance signal change, which is proportional to the change in temperature of the material. The pump power is proportional to the heat flux generated. Varying the power of the heat source pump laser beam to induce temperature rises, a simple analysis based on Fourier's law can be used to determine the thermal conductivity. Specifically, the measured reflectance signal and pump power data can be fitted to the thermal model. The thermal model is a function of a thermal conductivity of the material relating the heat flux to the temperature rise.

As the pump power and the resulting heat flux are varied, the temperature rise of the "on" state varies accordingly. As a function of the temperature, the reflectivity of the material varies with the temperature. By measuring the reflectance signal of the probe beam reflected from the material, the measured data can be fitted to a thermal model to determine the thermal conductivity. Since measurements are only taken in the steady-state regime, Fourier's law may be used to determine the thermal conductivity based on the linear relation between heat flux and temperature. In the present SSTR method, a fast transient temperature rise followed by a long-lived steady-state temperature rise allows for the steady-state temperature rise to be turned on and off cyclically. The cyclical steady-state temperature rise allows for the detection techniques such as the periodic waveform averager (PWA) and (lock-in amplifier) LIA to be used such that the very small relative change in reflectivity of a material with temperature can be measured. According to one embodiment of the present invention, a modulated CW pump laser beam is focused on the surface of a sample material. The probe laser beam may be a continuous wave laser having a constant power. The beam diameter of the pump laser can be highly variable. The maximum size may be unlimited. The minimum pump laser beam diameter is physically limited by the diffraction limit, equal to roughly half the laser wavelength. Steady-state techniques generally require large thermal resistances for accurate measurements, so that the minimum sample volume needed scales with the sample's thermal conductivity.

The size of the measured area on the surface of the material is governed by the pump laser beam diameter. The thermal penetration depth in the SSTR method is governed solely by the pump laser beam diameter. As such, the measurement volume of SSTR is independent of the thermal properties of the material. The spatial resolution in the SSTR is limited only by the ability to focus the pump and probe. In one example, pump/probe $1/e^2$ diameters can be as low as ~2 μm. This allows probing of the local thermal conductivities to avoid, for example, damaged regions of a bulk specimen that could otherwise obscure the intrinsic thermal conductivity.

Because transient temperature rise times can be on the order of tens of microseconds, the SSTR is capable of high throughput measurements, limited only by the electronics and sampling periods used. In some examples, typical measurement times vary from about ten seconds to five minutes per scan depending on the resolution needed. The SSTR method is a non-contact method, requiring no attached thermocouple. Because the time scales associated with SSTR measurements (i.e., greater than tens of microseconds) can be much longer than lifetimes of photoexcited carriers that can also contribute to changes in reflectivity, an additional transducer may not be needed.

As the heat flux diffuses into the material with the laser heating, the thermal reflectivity of the material changes as the temperatures of the material varies. As a probe beam is reflected from the focused pump beam spot on the material, the reflected probe beam having a reflectance signal may be detected and measured. As the pump beam periodically is turned on and off, the reflectance signal is also periodic corresponding to the cyclical temperature rise.

In one embodiment, the difference of the magnitude of the pump power is measured between the "on" and "off" states. The difference of the magnitude of the reflectance signals between the "on" and "off" states is measured. The thermal conductivity may be calculated by fitting the measured power difference and the measured reflectance signal difference to the thermal model.

In one embodiment, the SSTR method further includes a calibration step for obtaining the proportionality constant encompassing the thermoreflectance coefficient and the converting factor between the measured data and the predicted values by the thermal model. The calibration may be done with a material having a known thermal conductivity. A transducer may be required to carry out the calibration. The transducer may be of a material having the same optical properties as the material of interest.

In another embodiment, a dataset of the magnitude of the reflectance signal difference versus the pump power difference may be obtained as the pump power of the "on" state is varied. The pump power may be increased linearly so that a linear relation between the normalized reflectance signal and the pump power can be obtained. A linear fit is performed on the dataset to determine a slope, and the thermal conductivity is determined by comparing the slope to the thermal model after dividing by the proportionality constant calibrated.

The reflectance signal of the reflected probe beam may be measured using a periodic waveform analyzer via a digital boxcar average (PWA) or a lock-in amplifier (LIA), or any other detection schemes capable of detecting very small photoreflectance signals.

The thermal model is also a function of the modulation frequency and a diameter of the pump beam on the material. A smaller pump diameter allows for a steady-state temperature rise to be reached at a higher modulation frequency.

The pump laser beam is a continuous wave beam and may be modulated by an arbitrary periodic waveform such as sine, square, triangle, or the like. The steady-state is a quasi-steady-state when the CW pump laser is modulated by a sine wave.

The diameter of the probe beam may be highly variable and is preferably the same as or smaller than the diameter of the pump beam.

In another embodiment, the calibration can be omitted. Using power dependent sweeps, similar to the embodiment of the SSTR method with the calibration, the slope of the power versus the reflectance signal data can be obtained at two or more unique frequencies. The slope versus the modulation frequency can be obtained as a new data set to which the thermal model is fitted to measure the thermal conductivity. In the two-frequency approach, SSTR data is taken using two modulation frequencies that are separated enough to allow for distinct power vs. temperature trends. Because the proportionality constant relating the measured data to the thermal model is independent of modulation frequency, taking the ratio of the slopes between the two frequencies is independent of any scaling factors. Consequently, the thermal conductivity can be determined without the use of a calibration sample.

In another embodiment, the modulation frequency is swept over a range of frequencies ranging from 1 Hz to 1 GHz to map out the frequency response of the steady state signal. Then, the data is fitted to the thermal model. In this case, the pump power at the "on" state is kept constant.

According to an embodiment of the present invention, a system for measuring thermal conductivity of a material includes a pump laser source for emitting a CW pump laser beam, a modulator for modulating the CW pump laser beam, a probe laser source for emitting a CW probe laser beam, detectors for measuring the waveform and power of the pump laser beam and the waveform and the magnitude of the reflectance signal of the reflected probe laser beam, optical components for directing and focusing the pump laser beam and probe laser beam onto a surface of the material, and a processing unit for storing and processing measured data and calculating the thermal conductivity.

In one example, a CW probe laser having a wavelength of 786 nm and output power up to 30 mW, and a CW pump laser with a wavelength of 532 nm and output power up to 5 W are used. In practice, the pump power may be limited to less than 200 mW except in the case of the most conductive materials, where output powers up to 1 W proved sufficient for the pump radii used. Likewise, the probe output may be limited to less than 1 mW to avoid any additional heating of the sample material.

The dimension of the materials to be measured by the present system can be highly variable and is governed by the probe/pump laser diameters. The materials measured may be thin films or bulk materials. In some examples, probe/pump laser $1/e^2$ diameters used may be 1 μm, 10 μm, 100 μm and the like. In principle, there is no upper limit to the diameter of a focused laser beam.

The present system may be used for measuring the thermal conductivity of a wide array of materials having thermal conductivities ranging from 1 to >2000 W $m^{-1}K^{-1}$. The examples of the materials includes metal, ceramics, insulating materials, such as $Al_2O_3$, Al, and diamond.

The modulator for modulating the CW pump laser beam may be a mechanical chopper or an electro-optic modulator. The pump laser may also be internally modulated. The modulation frequency is low enough to induce a cyclical steady-state temperature rise on a spot of the material where the pump laser beam is focused.

In one example, the modulation frequency is selected to define a period longer than the rise time of the temperature rise. In another example, the modulation frequency is selected to define a period longer than the 95% rise time of the temperature rise.

The examples of the detectors for measuring the waveform and power of the pump/probe laser beam are power meters or photodetectors. The pump power and the magnitude of the reflectance signal may be measured separately or simultaneously.

In one embodiment, a lock-in amplifier (LIA) may be used to measure the waveform and magnitude of the pump/probe signal. The LIA is synced to the chopper frequency so that the magnitude ($\Delta V$) of the probe signal divided by the DC probe signal (V) is recorded simultaneously with the lock-in magnitude of the pump photodetector ($\Delta P$). AP as determined by the LIA is proportional to the amplitude of the sinusoidal component of the pump waveform. Likewise, $\Delta V$ corresponds to only the sinusoidal component of the probe waveform. LIA detection thus allows for modulation of the pump with an arbitrary periodic waveform (square, sine, triangle, etc.) and with any offset power to obtain the same relation between the lock-in pump power and lock-in probe magnitude. The pump power is increased linearly so that a linear relation between $\Delta V/V$ with pump power is obtained. The slope of this relation, after determining the appropriate proportionality constant, is used to determine thermal conductivity by comparing it to a thermal model given in the "Thermal models" section.

Alternatively, a PWA with boxcar averager is used to record both the pump and probe waveforms over several periods of temperature oscillation by again syncing to the chopper frequency. Using this approach, the sample temperature rise vs. time to determine the steady-state regime of the temperature rise can be visualized.

In one embodiment, thermoreflectance measurements use a thin metal transducer. The purpose of using a transducer is two-fold. First, the transducer can serve as a calibration sample for the SSTR measurement. Usually, the calibration sample is required to have the same optical properties as the material of interest. Second, the tranducer can be used if the material of interest is transparent to the laser beam.

The system further includes a processing unit capable of communicating with the detectors for storing the measured data and performing signal analysis.

At the processing unit, the thermal conductivity can be calculated in accordance with various embodiments of the method discussed. For example, the thermal conductivity is calculated by fitting the measured difference of the power and the measured difference of the magnitude of the reflectance signal to a thermal model, which is a function of a thermal conductivity of the material relating the heat flux to the temperature rise.

BRIEF DESCRIPTION OF THE DRAWINGS

FIGS. 2A-2D are plots showing pump and probe waveforms;

FIG. 2E is a schematic showing laser heating and heat diffusion in the material;

Figure 4A:
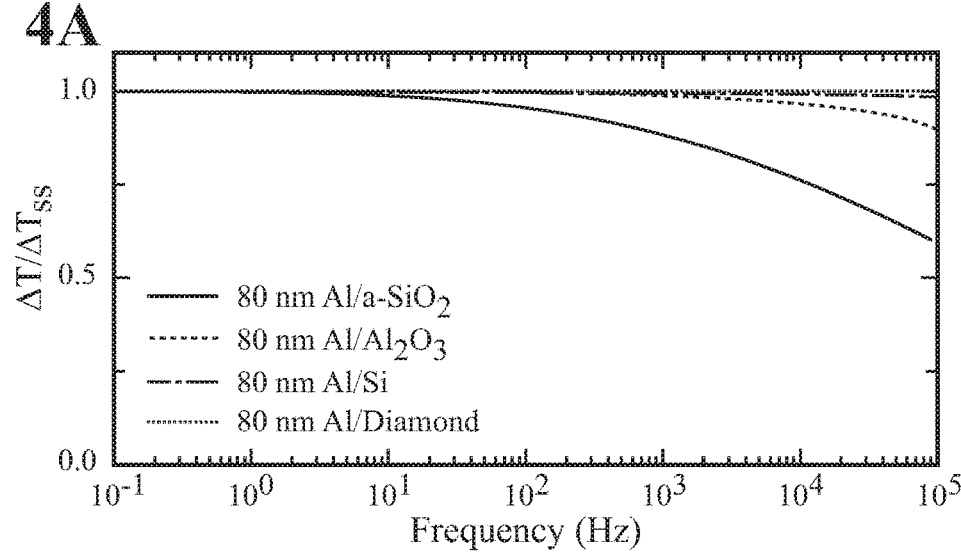
Figure 4B:
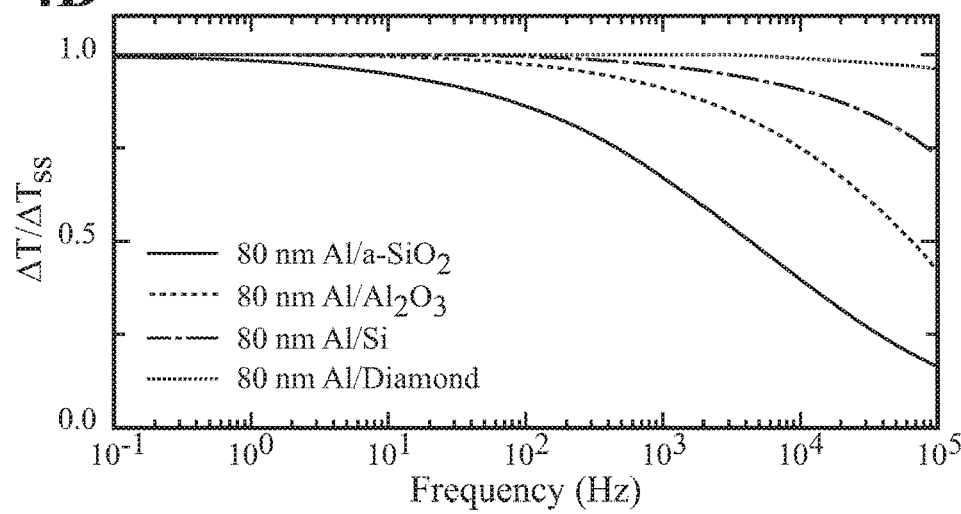
Figure 4C:
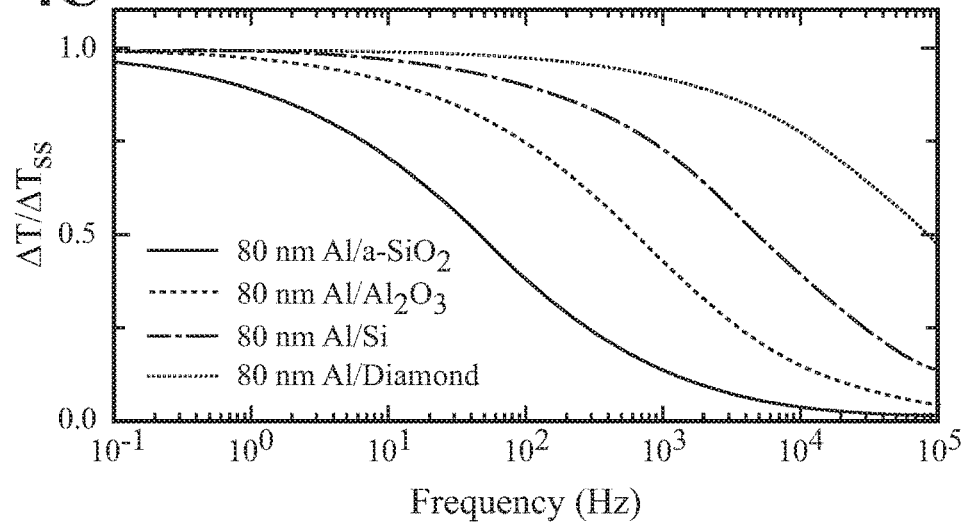
Figure 5A:
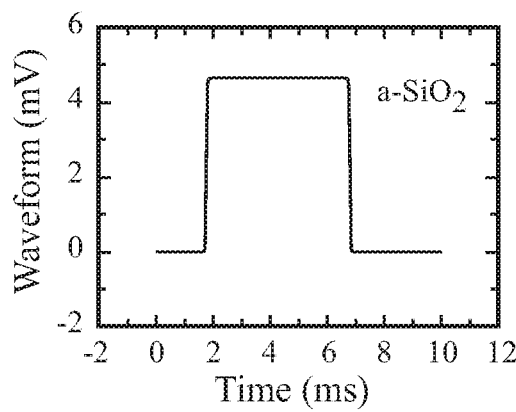
Figure 5B:
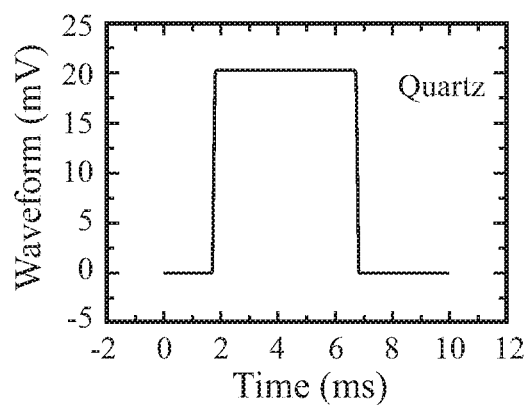
Figure 5C:
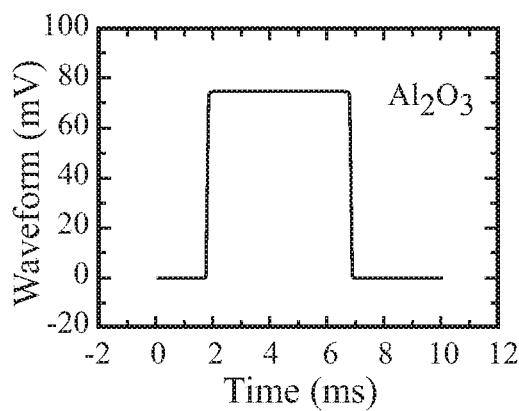
Figure 5D:
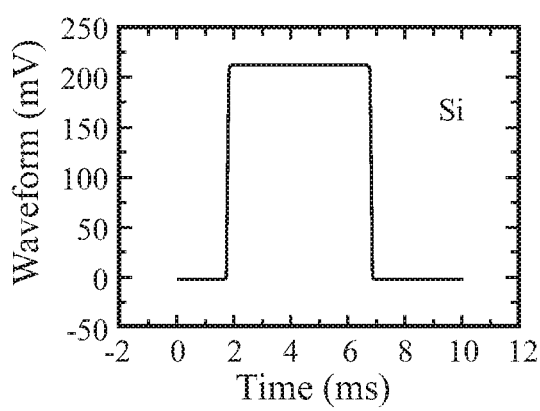
Figure 5E:
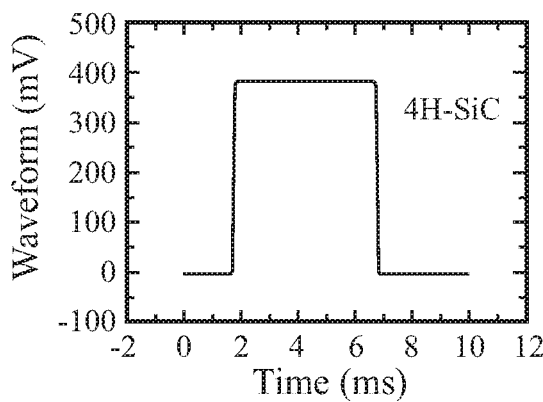
Figure 5F:
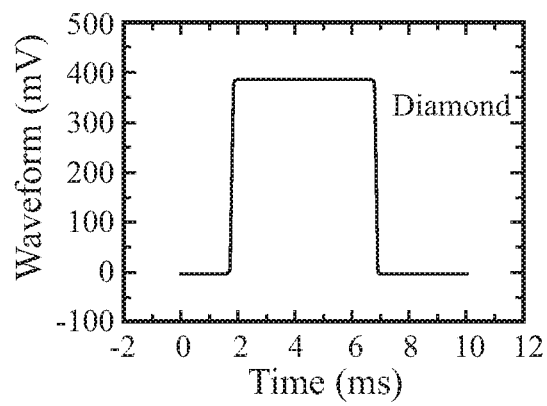
Figure 6A:
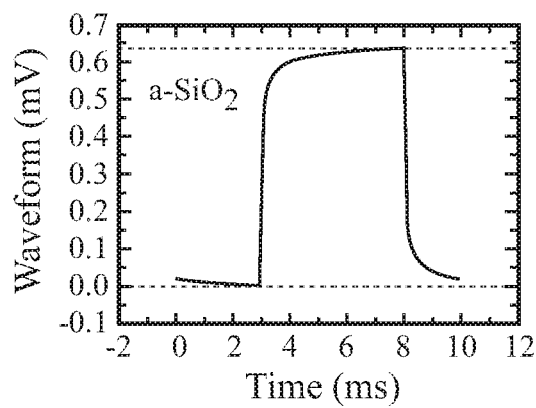
Figure 6B:
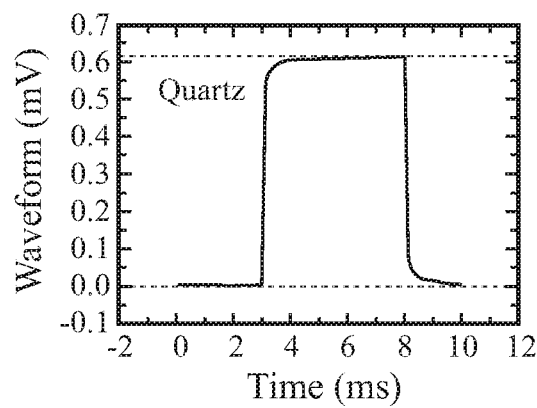
Figure 6C:
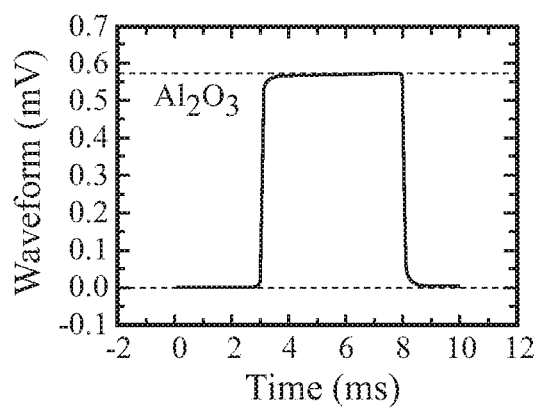
Figure 6D:
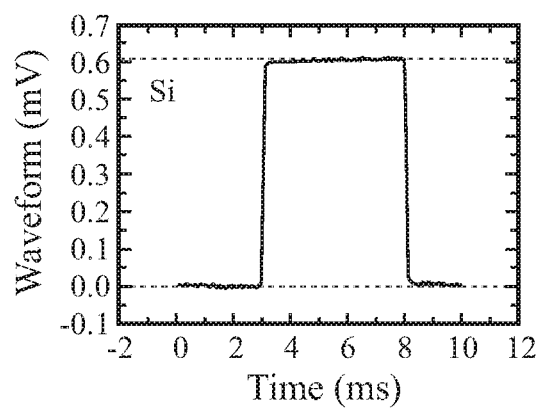
Figure 6E:
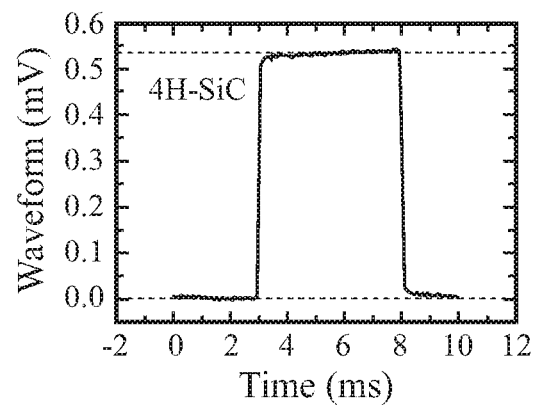
Figure 6F:
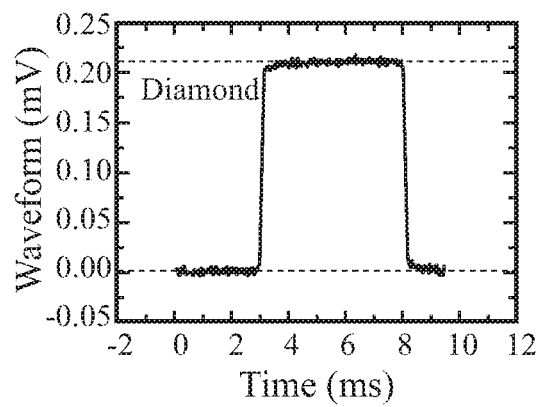
Figure 7A:
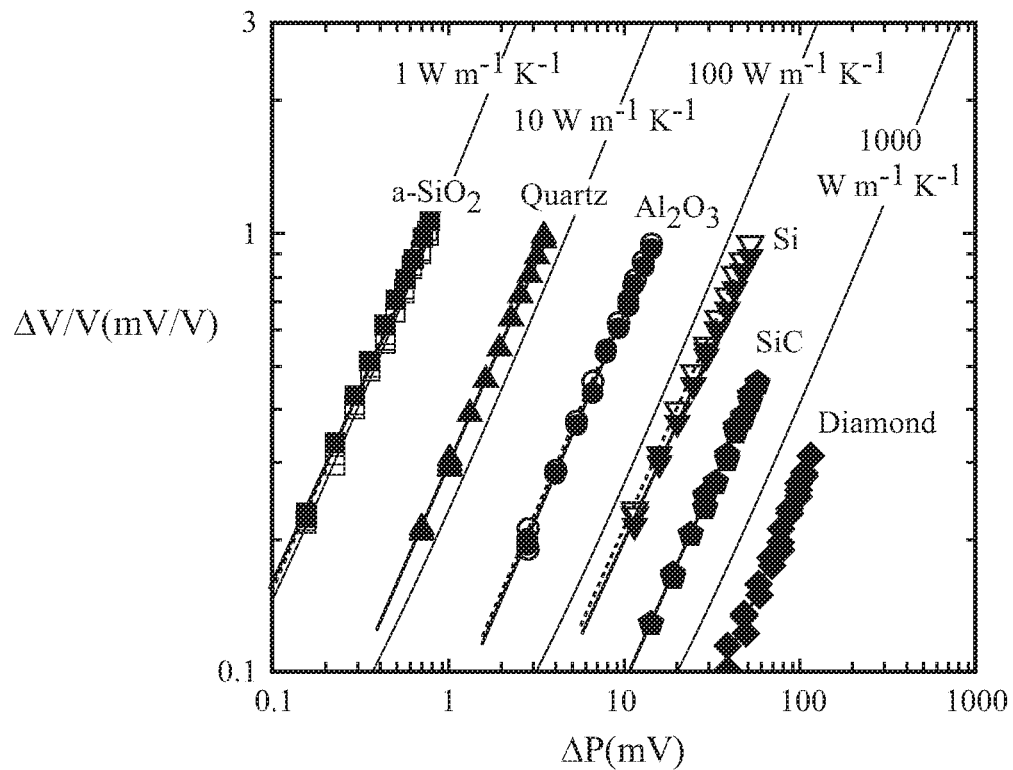
Figure 7B:
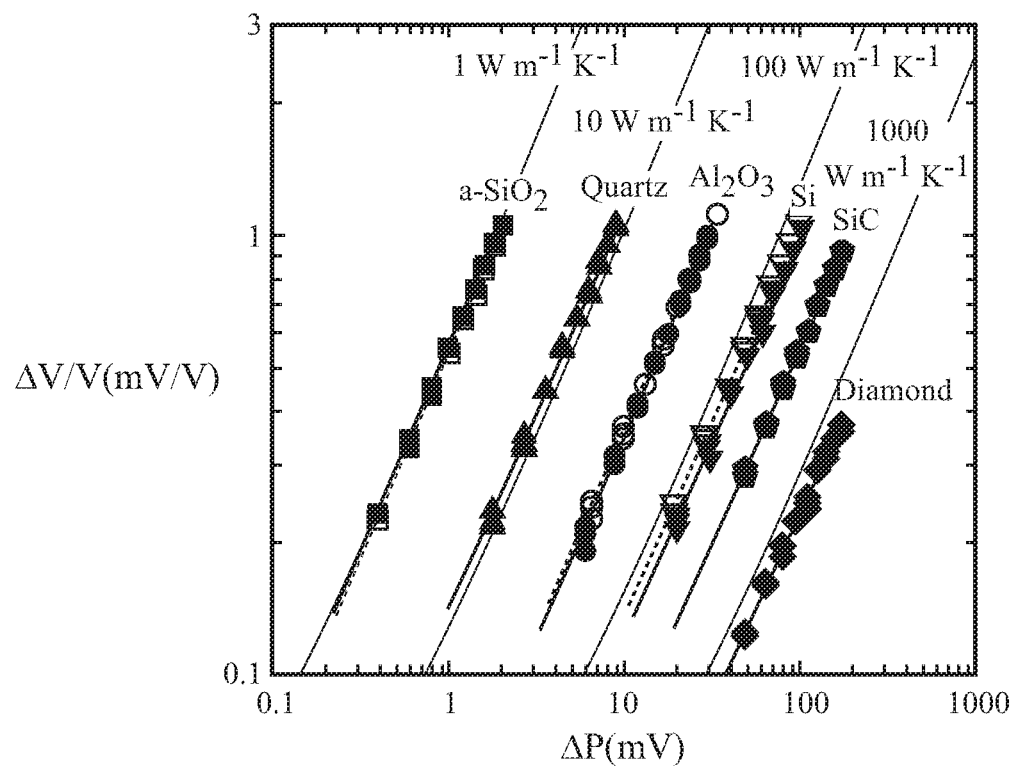

Figure C is a plot showing normalized temperature rise versus Fourier number;

FIGS. 4A-4C are plots showing normalized temperature rise versus modulation frequency for CW laser surface heating with an amplitude modulated sinusoidal profile;

FIGS. 5A-5F are plots showing pump waveforms obtained using a periodic waveform analyzer shown for (a) a-SiO$_2$, (b) quartz, (c) Al$_2$O$_3$, (d) Si, (e) 4H—SiC, and (f) diamond;

FIGS. 6A-6F are plots showing probe waveforms using a periodic waveform analyzer shown for (a) a-SiO$_2$, (b) quartz, (c) Al$_2$O$_3$, (d) Si, (e) 4H—SiC, and (f) diamond;

FIGS. 7A-7B are plots showing measured $\Delta V/V$ vs. $\Delta P$ ($\infty$ pump power) shown for 10× objective lens (pump and probe $1/e^2$ diameters of 20 μm) and 20× objective lens (pump and probe $1/e^2$ diameters of 11 μm) respectively for glass slide, BK7 glass, quartz, sapphire wafer, sapphire window, silicon wafer, silicon window, 4H—SiC, and diamond.

Figure 8A:
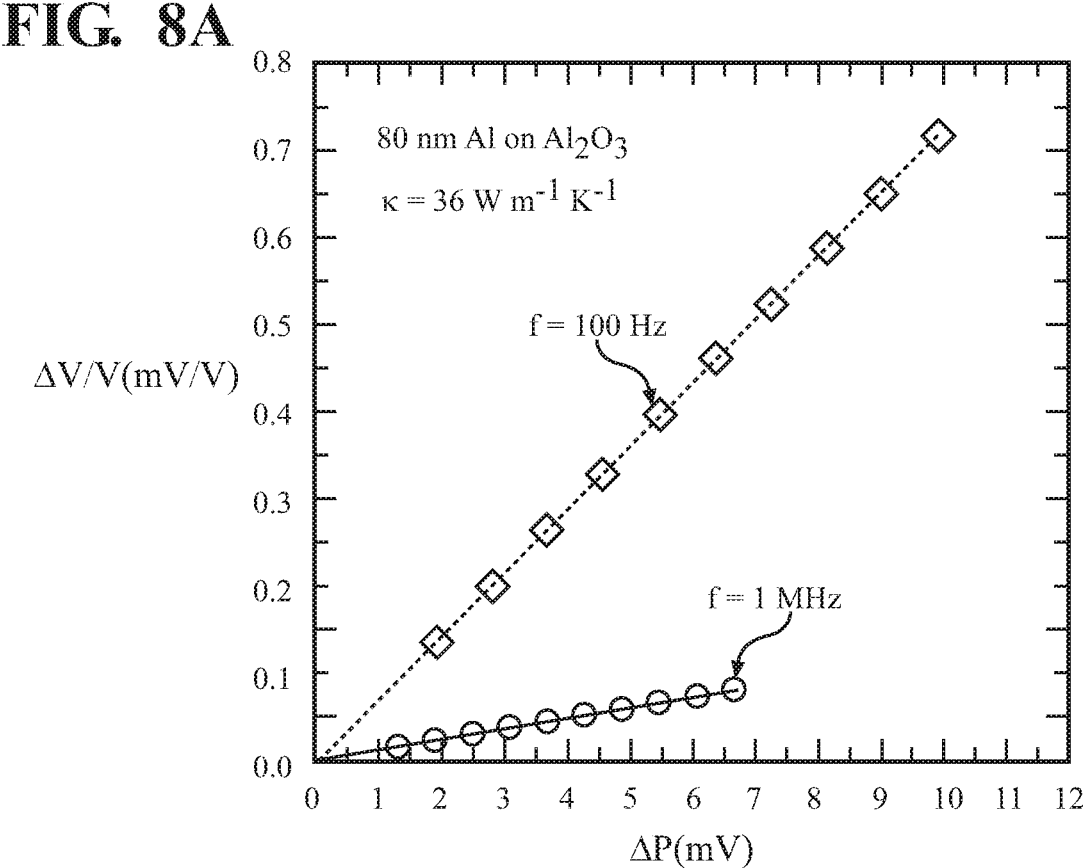
Figure 8B:
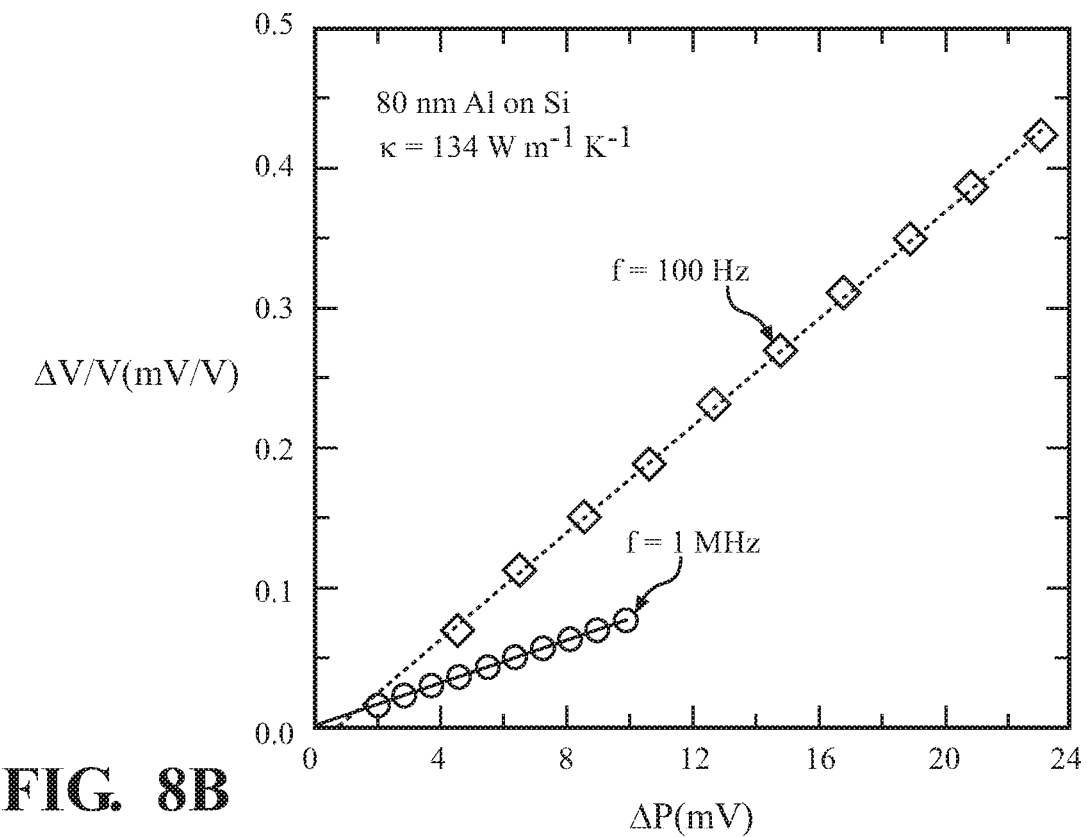
Figure 8C:
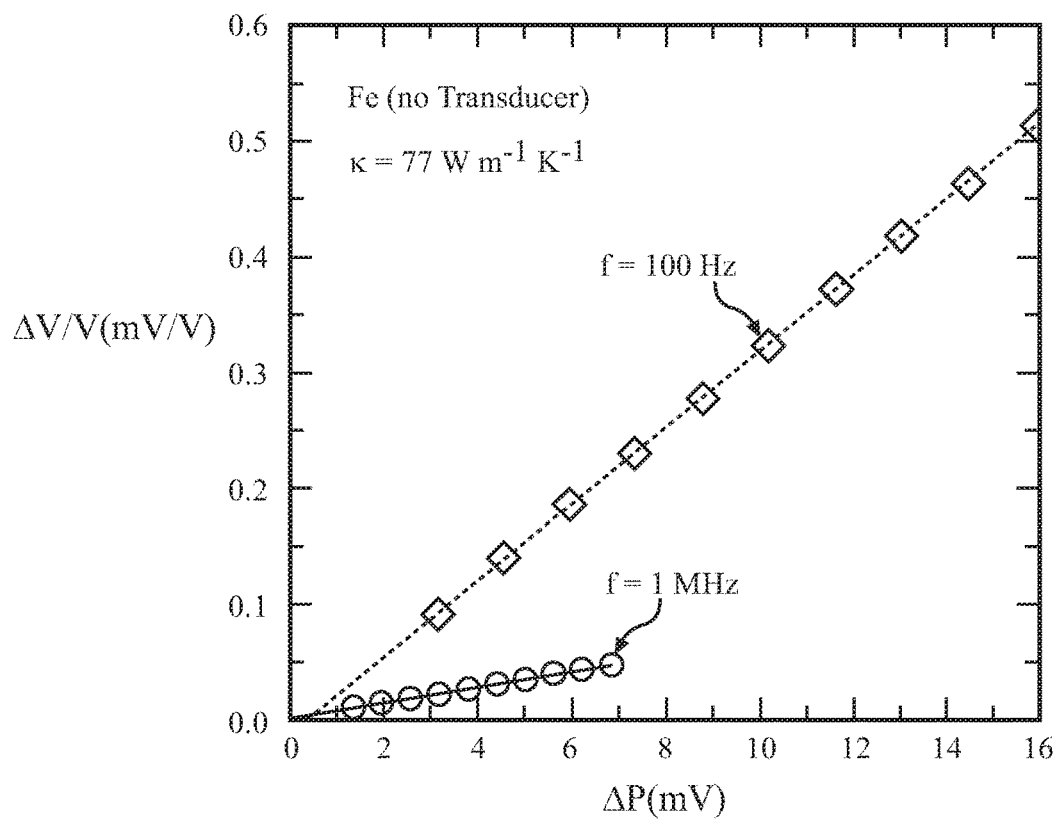
Figure 9:
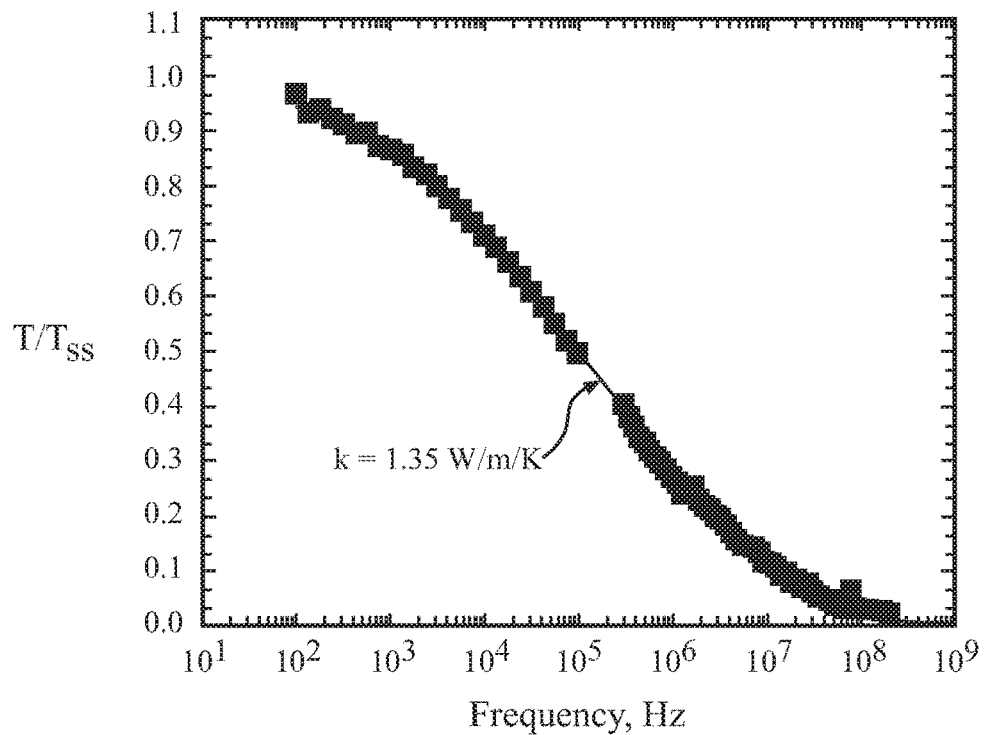
Figure 10A:
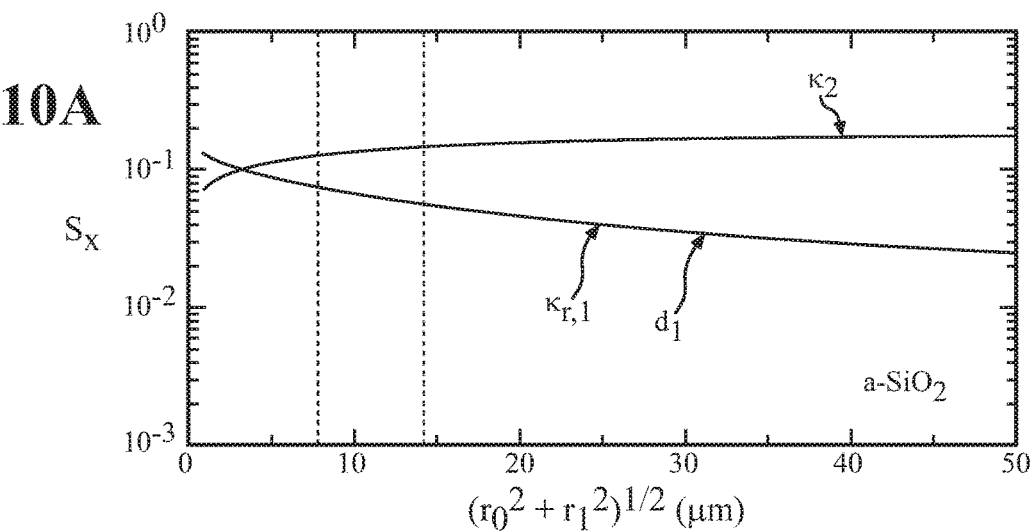
Figure 10B:
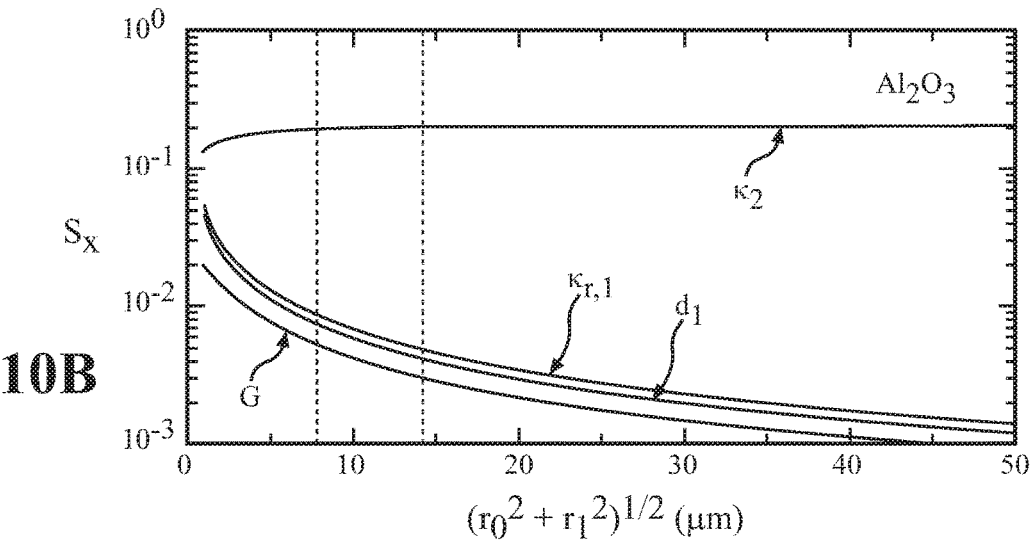
Figure 10C:
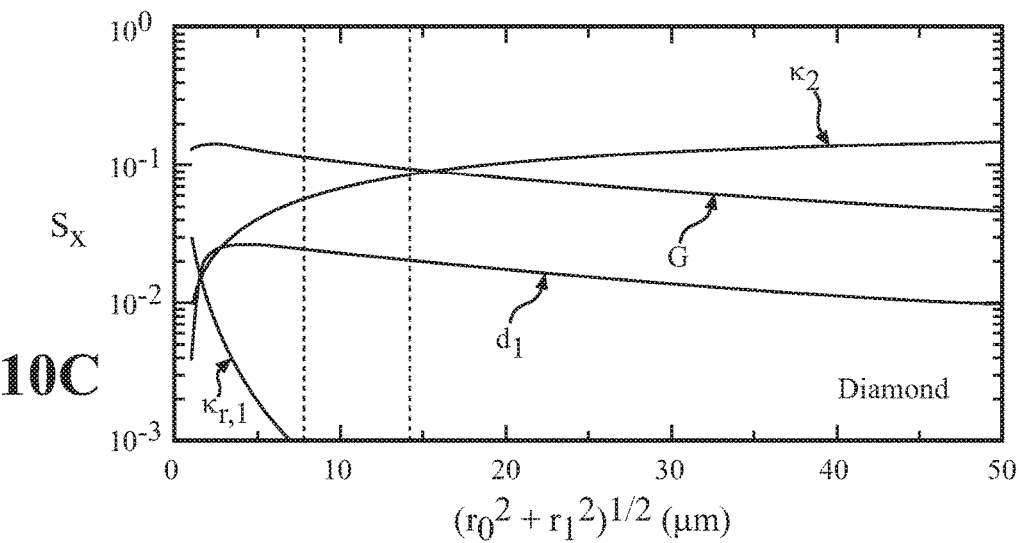
Figure 12:
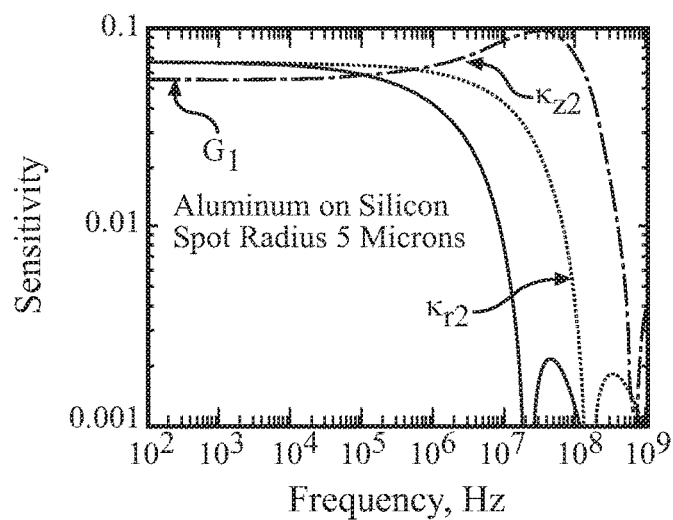
Figure 13:
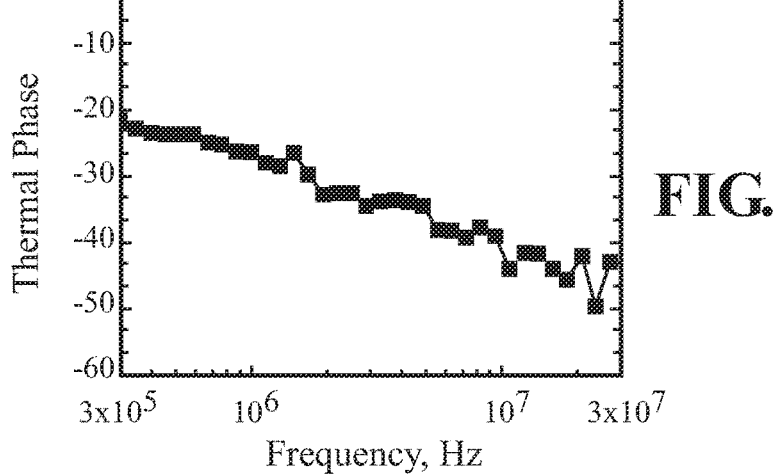
Figure 14:
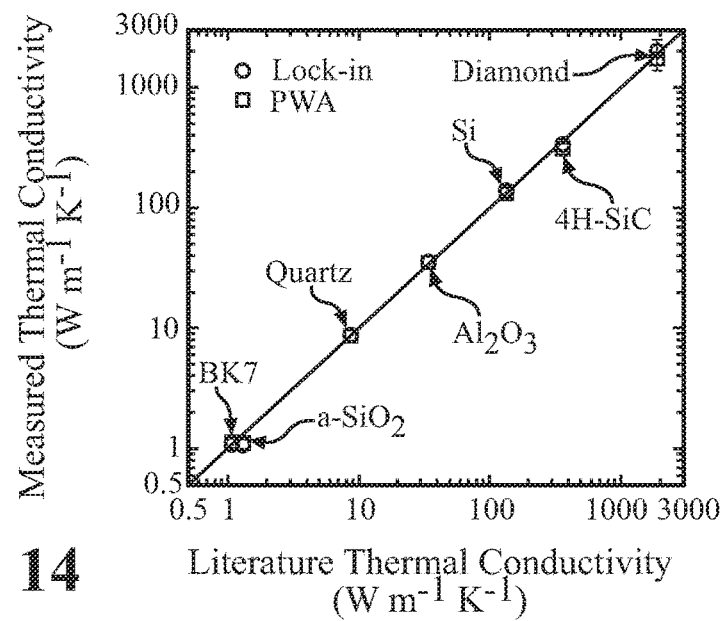
Figure 15A:
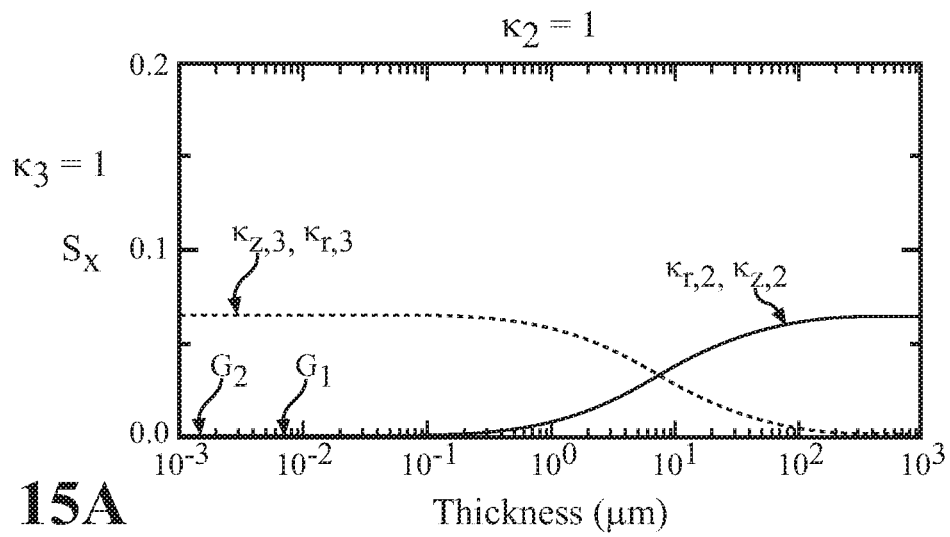
Figure 15B:
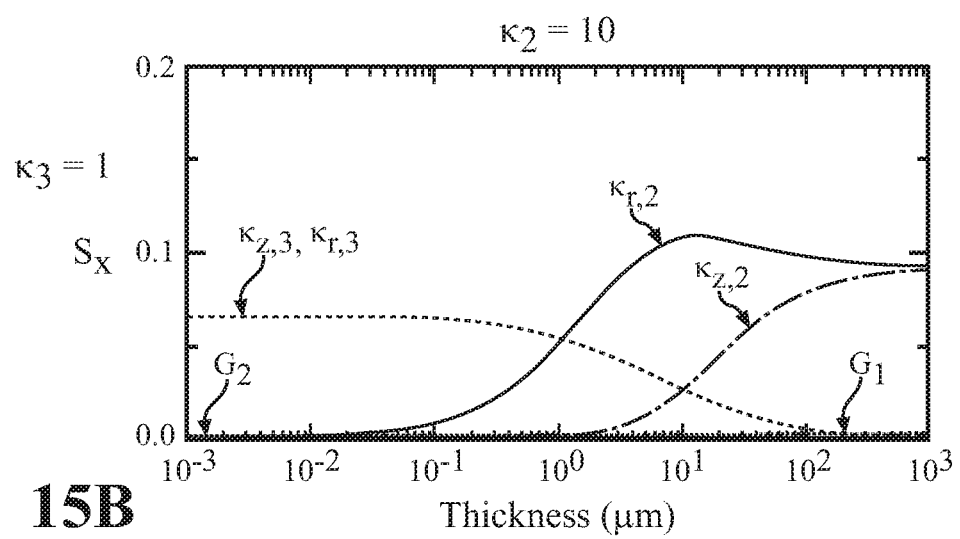
Figure 15C:
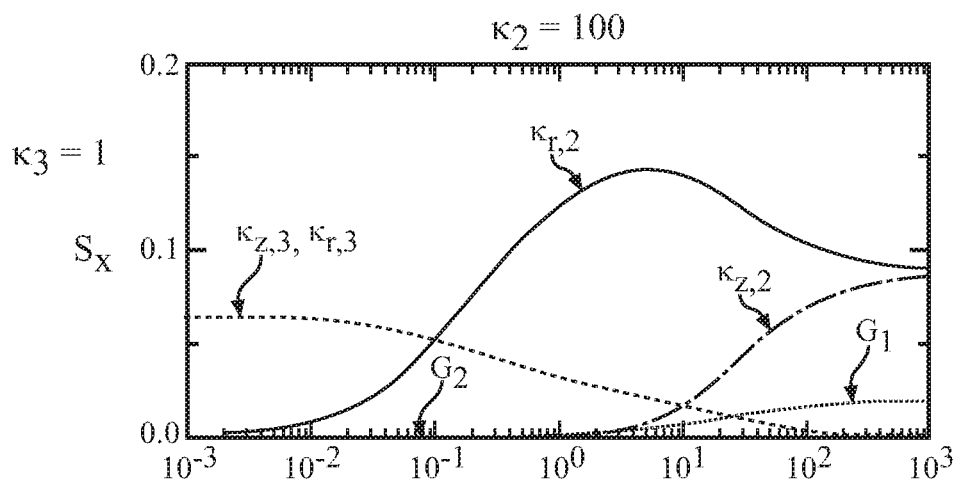
Figure 15D:
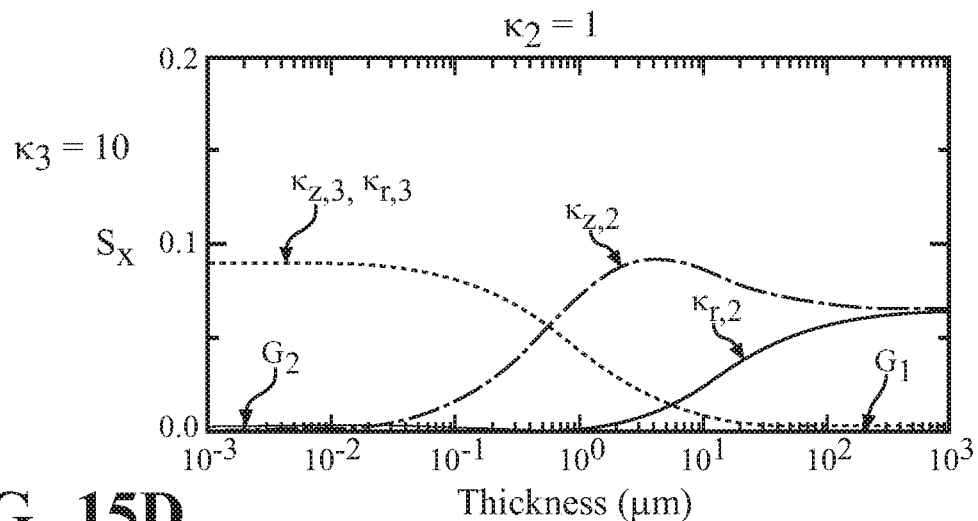
Figure 15E:
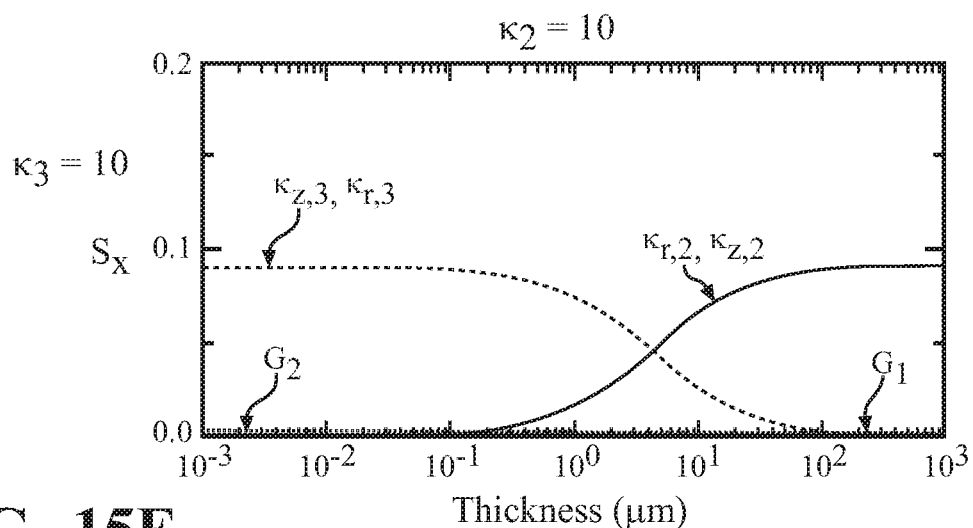
Figure 15F:
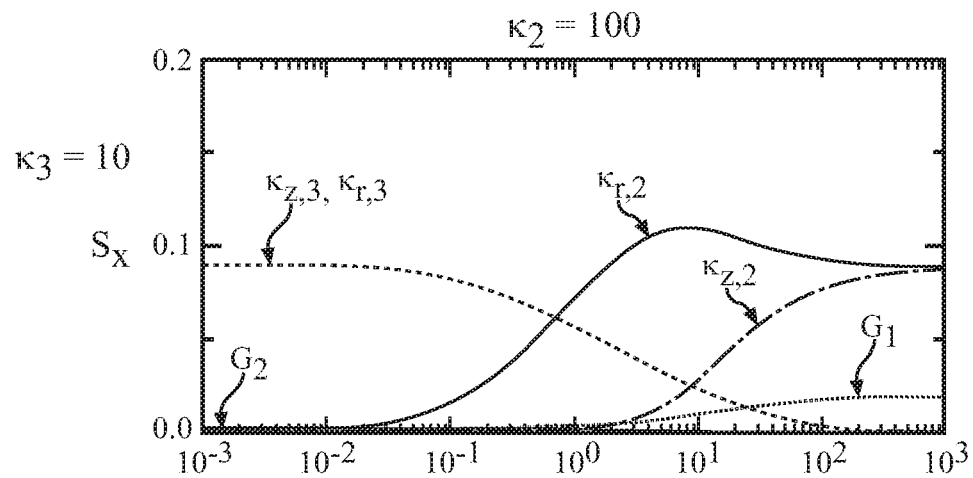
Figure 15G:
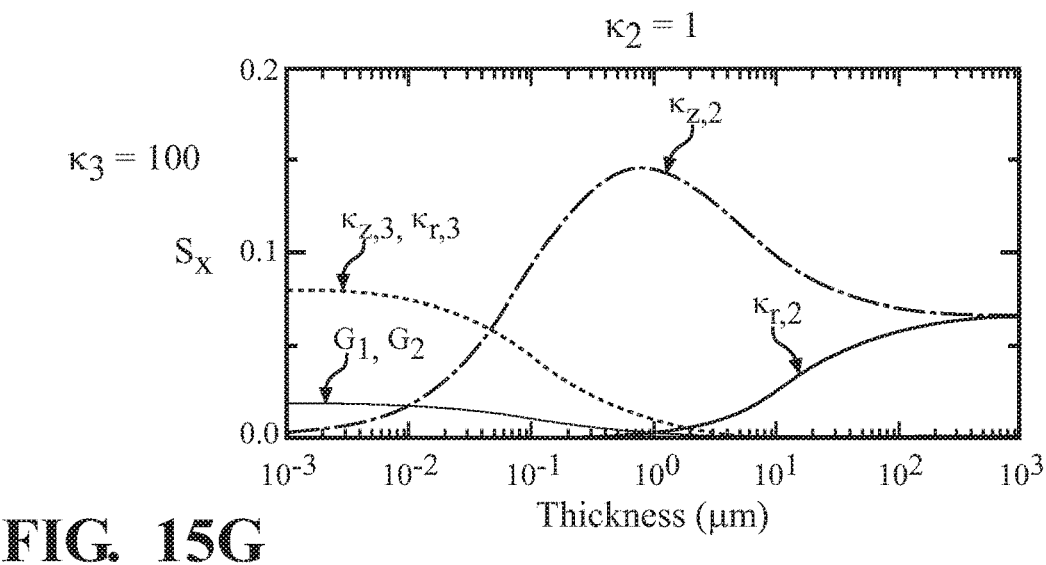
Figure 15H:
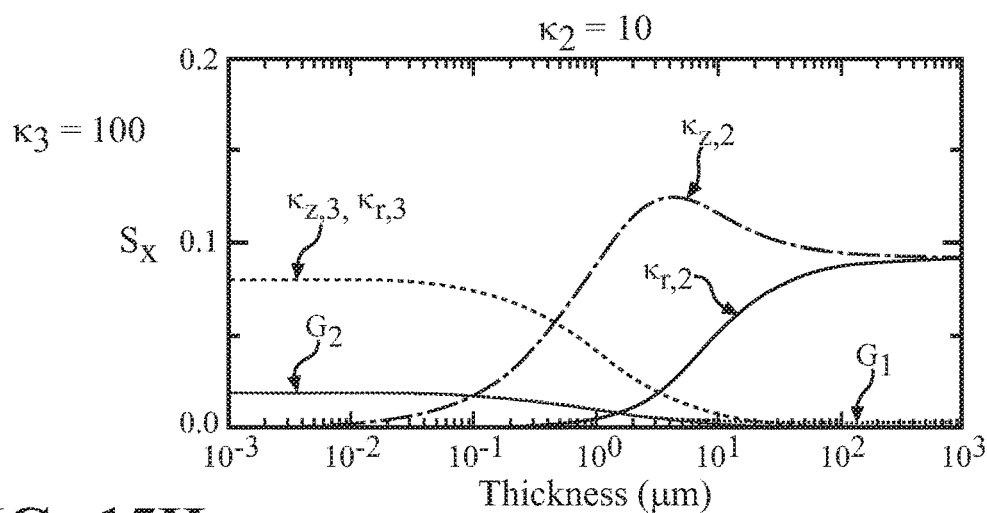
Figure 15I:
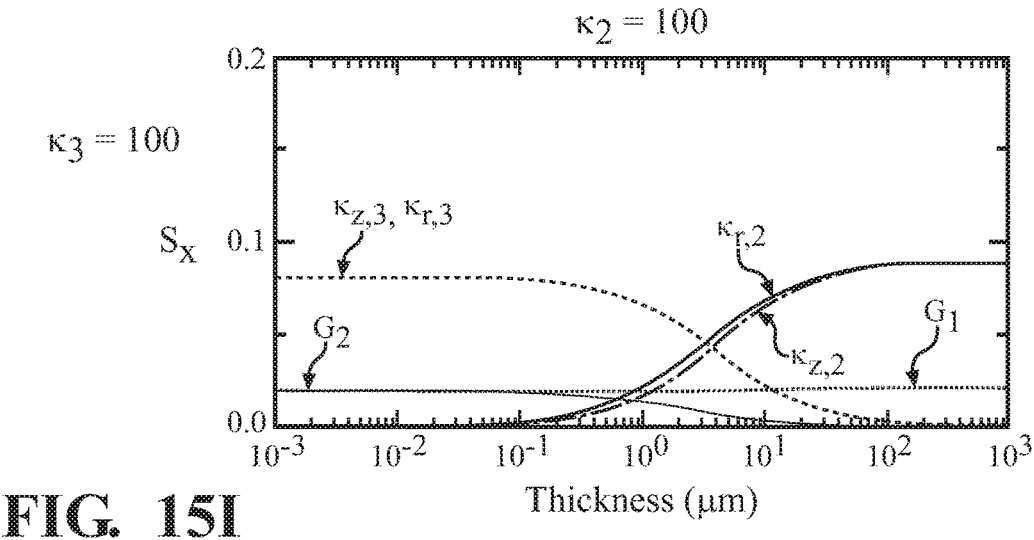

FIGS. 8A-8C are plots showing measured $\Delta V/V$ vs. $\Delta P$ ($\infty$ pump power) shown for two different modulation frequencies for 80 nm Al on Al$_2$O$_3$, 80 nm Al on Si, and electrolytic iron without a tranducer;

FIG. 9 is a plot showing frequency response of the steady-state signal;

FIGS. 10A-10C are plots showing Sensitivity, $S_x$ versus effective radius, defined as $\sqrt{r_0^2 + r_1^2}$, where $r_0$ and $r_1$ are the pump and probe radii, respectively, shown for a-SiO$_2$, Al$_2$O$_3$, and diamond;

FIGS. 11A-11C are plots showing thermal conductivity, x, vs. thermal boundary conductance, G, between the Al transducer and silicon, 4H—SiC, and diamond;

FIG. 12 is a plot showing increased sensitivity to multiple parameters enabled by an embodiment of the present invention;

FIG. 13 is a plot showing thermal phase data captured simultaneously using the present method;

FIG. 14 is a plot showing measured thermal conductivity versus literature thermal conductivity using both the lock-in amplifier analysis and periodic waveform analysis methods; and FIGS. 15A-15I are plots showing sensitivity to thermal parameters of a three-layer model (1: 80 nm transducer/2: film/3: substrate) versus layer 2 film thickness shown for the nine cases considered A: $\kappa_2=1$, $\kappa_3=1$, B: $\kappa_2=10$, $\kappa_3=1$, C: $\kappa_2=100$, $\kappa_3=1$, D: $\kappa_2=1$, $\kappa_3=10$, E: $\kappa_2=10$, $\kappa_3=10$, F: $\kappa_2=100$, $\kappa_3=10$, G: $\kappa_2=1$, $\kappa_3=100$, H: $\kappa_2=10$, $\kappa_3=100$, and I: $\kappa_2=100$, $\kappa_3=100$ W m$^{-1}$ K$^{-1}$.

DETAILED DESCRIPTION OF THE INVENTION

A system, method and computer readable medium enable the measurement of thermal conductivity of bulk materials.

According to an embodiment of the present invention, a thermoreflectance based optical pump-probe technique is used to measure the thermal conductivity of bulk materials based on measuring the steady-state temperature rise resulting from a periodic laser heat source. These embodiments modulate a continuous wave (CW) pump laser with a periodic waveform at a modulation frequency to cycle the temperature rise on and off. The modulation frequency may be low enough that the pump laser is left on long enough to induce a steady-state temperature rise in the material during each cycle. By cycling the temperature rise on and off, a probe beam can be used to detect the resulting change in the reflectance, which is proportional to the change in temperature of the material. Varying the power of the pump beam to induce temperature rises, a simple analysis based on Fourier's law can be used to determine the thermal conductivity. These embodiments are capable of measuring the thermal conductivity of a wide range of materials ranging from thermally insulating to thermally conductive materials and is capable of measuring materials having thermal conductivities ranging from 1 to >2000 W m$^{-1}$K$^{-1}$, showing excellent agreement with literature values.

As the pump power and the resulting heat flux are varied, the temperature rise of the "on" state varies accordingly. As a function of the temperature, the reflectivity of the material varies with the temperature. By measuring the reflectance signal of the probe beam reflected from the material, the measured data can be fitted to a thermal model to determine the thermal conductivity. In various embodiments, the transient temperature rise is ignored and measurements are only taken in the steady-state regime. Therefore, these embodiments might be called steady-state thermoreflectance (SSTR) methods. Since measurements are only taken in the steady-state regime, Fourier's law may be used to determine the thermal conductivity based on the linear relation between heat flux and temperature. In the present SSTR method, a fast transient temperature rise followed by a long-lived steady-state temperature rise allows for the steady-state temperature rise to be turned on and off cyclically.

Detection of reflectivity (R) changes due to an induced temperature (T) rise is limited by the very small relative change in reflectivity of a material with temperature. For typical metals used as transducers in thermoreflectance experiments, |dR/dT|, is on the order of $10^{-5}$ or $10^{-4}$ K$^{-1}$. This limitation can be overcome two ways. Using a periodic heat source, lock-in amplification (LIA) technique overcomes this limitation though amplification and electronic filtering. Similarly, a periodic waveform analyzer (PWA) with a boxcar averager can be used with a large enough sampling time to extract a periodic signal. In the present invention, the periodic heat flux from the modulated heat pump beam and the cyclical thermoreflectance signals from the probe beam enable use of the signal detection schemes such as the LIA and PWA.

According to an embodiment of the present invention, the system for measuring the thermal conductivity may include a pump laser source and a probe laser source. The pump laser and probe laser may be either the same laser source or separate laser sources. The pump laser may be modulated by a modulator such as a mechanical chopper or an electro-optic modulator. The pump laser may be capable of internal modulation: this could further enhance simplicity and minimize cost. The system might also monitor and measure the pump power and probe magnitude. Such monitoring and measuring can be performed by resort to a power meter or a photodetector.

The probe reflectivity response (reflectance signal) measured by the photodetector, $\Delta V/V$, is proportional to the normalized change in reflectivity, $\Delta R/R$, which is related to the change in temperature of the sample surface by the thermoreflectance coefficient $\beta$, so that $$\frac{\Delta R}{R} = \left(\frac{1}{R}\frac{\partial R}{\partial T}\right)\Delta T = \beta \Delta T. \quad (1)$$

In general, $\beta$ is temperature dependent. For Al, $\beta$ is $1.14 \times 10^{-4}$ K$^{-1}$ and varies at a rate of $0.22 \times 10^{-4}$ per 100 K near a probe wavelength of 786 nm. Keeping temperature rises below 50 K ensures $\beta$ varies less than 10%.

According to one embodiment of the present method, using the thermoreflectance coefficient and an additional conversion of $\Delta V/V$ to $\Delta R/R$, $\Delta T$ can be obtained. Next, by measuring the power of the pump and the reflectance of the sample at the pump wavelength, the heat flux absorbed by the sample can be calculated. These two quantities allow for the determination of thermal conductivity through Fourier's law applied to a semi-infinite substrate. Thus, accurate determination of heat flux and temperature allow for an absolute technique to directly measure thermal conductivity.

Since $\Delta V/V$ and the pump photodetector response, $\Delta P \propto$ pump power can be measured, seemingly there are two proportionality constants to consider, one relating $\Delta V/V$ to $\Delta T$ and one relating $\Delta P$ to the heat flux magnitude $\Delta |Q|$. One of these proportionality constants can be eliminated by determining $\Delta V/(V \Delta P)$, so that $$\left(\frac{\Delta V}{V\Delta P}\right) = \gamma\left(\frac{\Delta T(\kappa)}{\Delta |Q|}\right), \quad (2)$$

where $\Delta T/\Delta |Q|$ is calculated using the thermal model presented in the "Thermal models" section.

According to another embodiment of the present method, the proportionality $\gamma$ can first be determined. Then, the measured data $\Delta V/(V \Delta P)$ may be fitted with $\Delta T/\Delta |Q|$ calculated using the thermal model. An optimum value of the thermal conductivity K can therefore be determined.

A calibration can be performed, with a known thermal conductivity, to determine $\gamma$, $$\gamma = \left(\frac{\Delta T(\kappa_{cal})}{\Delta |Q|}\right)^{-1}_{cal}\left(\frac{\Delta V}{V\Delta P}\right)_{cal}. \quad (3)$$

In one example, the calibration used to determine $\gamma$ is a single-crystal sapphire (Al$_2$O$_3$) wafer, measured to have a net thermal conductivity ($\sqrt{\kappa_r\kappa_z}$) of 35±2 W m$^{-1}$ K$^{-1}$ using both time-domain thermoreflectance and a hot-disk transient plane source technique (Hot Disk AB-TPS 3500). $\gamma$ can be determined by comparing the measured $\Delta V/(V \Delta P)$ to the $\Delta T$ predicted using the thermal model.

With $\gamma$ defined by a calibration, measurement of $\Delta V/(V \Delta P)$ for any sample can be related to the sample's thermal conductivity by relating it to a thermal model predicting $\Delta T(\kappa)/\Delta |Q|$. The thermal conductivity input to the model may be adjusted to obtain the best fit to the measurement data. In one example, a global minimization algorithm is used to search for the smallest absolute difference between model and data. The assumption using this approach is that the proportionality constant $\gamma$, which encompasses the thermoreflectance coefficient and conversion factor of change in reflectance to change in photodetector voltage, is equivalent between calibration and sample. To ensure this, a transducer layer can be used to ensure the thermoreflectance coefficient is the same from sample to sample.

In another embodiment, a number of magnitudes of probe lock-in voltage $\Delta V/V$ may be captured as a function of the same number of pump power $\Delta P$ such that a slope of $\Delta V/(V \Delta P)$ can be obtained. Then, the thermal conductivity input to the model may be adjusted to obtain the best fit to the slope.

In an example, an 80 nm Al transducer layer is evaporated on all samples under the same deposition. As a general rule, the input power of the pump may be adjusted to induce approximately the same magnitude of $\Delta V/V$ for each sample. This ensures that any nonlinear responses, whether from physical parameters such as the thermoreflectance coefficient or from the photodetector response, however small, are offset since they are encompassed in γ.

To establish the criteria needed to induce a steady-state temperature rise "on" state, the heat diffusion equation in the time-domain can be solved to determine the time needed for the temperature rise to reach an equilibrium, i.e., a steady-state. The derivation for this solution is provided in the "Thermal models" section. Two input parameters can be balanced to determine the operating conditions needed to achieve steady-state: the pump/probe radius and the modulation frequency of the pump.

The contemplated techniques of the present invention can achieve the steady-state very rapidly since the diameter of the pump beam is highly variable. The maximum diameter of the pump beam may be unlimited. The minimum laser size may be physically limited by the diffraction limit, equal to roughly half the laser wavelength. In practice, focused diameters of about 1 micron may be achieved.

The present techniques are applicable to materials having a wide range of thickness, and are especially advantageous in analyzing materials of very low thickness. This is a function of the focused spot size of the pump beam.

Figure 3A:
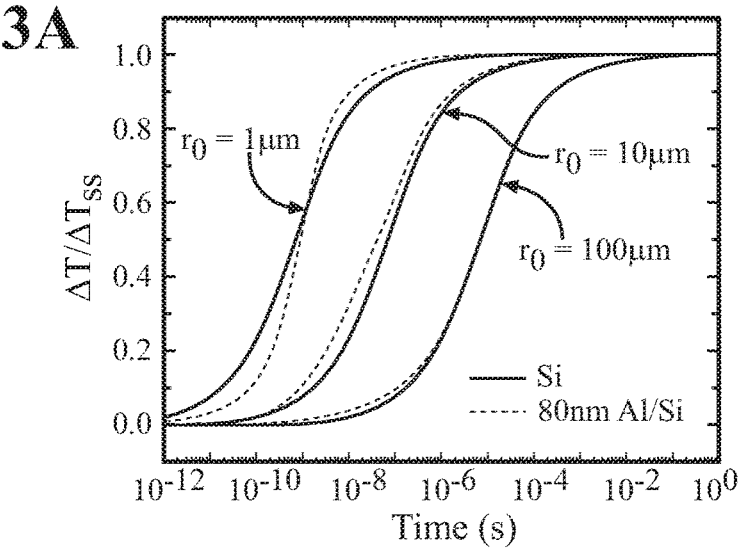
FIGS. 3A-3B are plots showing normalized temperature rise versus time for CW laser surface heating for different $1/e^2$ diameters.
Figure 3B:
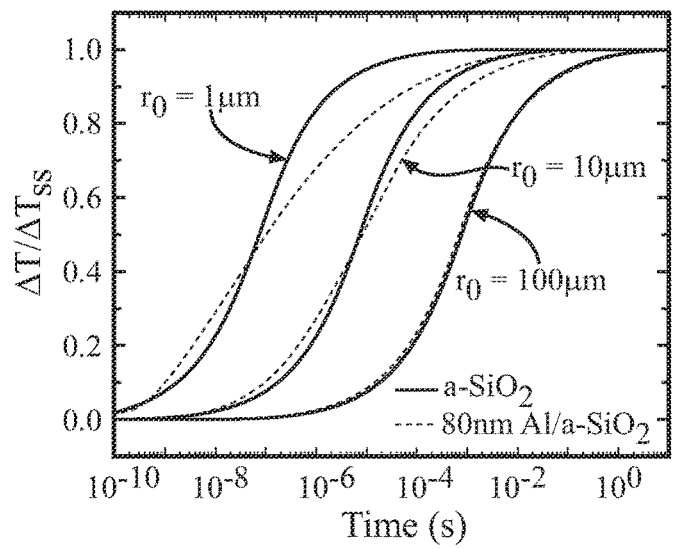
Figure 3C:
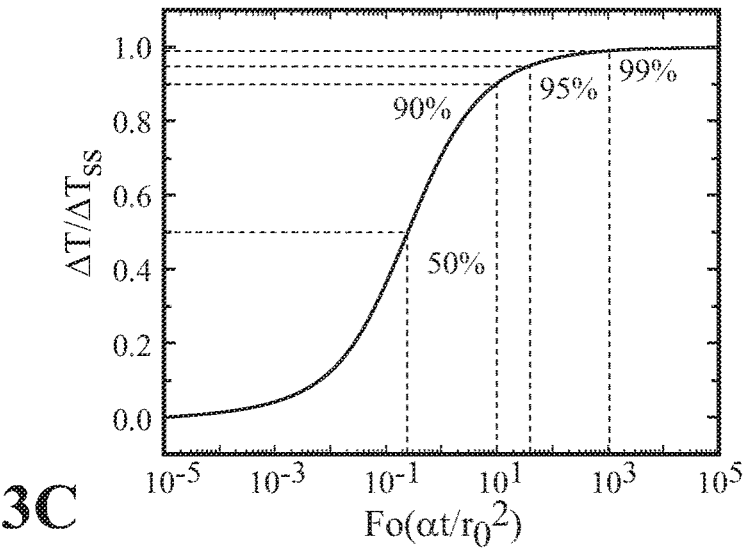

The pump/probe radius and the modulation frequency of the pump can be balanced to determine the operating conditions (criteria) needed to achieve a steady-state. As shown in FIGS. 3A-3C, which will be described in more detail hereinbelow, increasing the pump diameter increases the rise time to reach a quasi-steady-state temperature rise. In other words, smaller laser spot size allows for a quasi-steady-state temperature rise to be reached at higher modulation frequencies. A non-dimensional Fourier number Fo=$\alpha t/r_0^2$, where a is the thermal diffusivity, t is time, and $r_0$ is the pump radius, may be used to provide a universal criterion to determine the rise times for any material. FIG. 3C shows the relation between $\Delta T/\Delta T_{ss}$ and Fo.

Mathematically, there is no significance in any difference in spot sizes between the pump and probe in that all temperature rise is dependent on the square root of the sum of the squares of the pump and probe radii.

Physically, the thermal penetration depth (the depth into the thickness of the sample that the temperature gradient is significant) depends on the pump spot size alone.

The detected temperature rise that is measured is based on the change in reflectance that results from the change in temperature of the sample. If the probe beam spot size is large relative to the pump spot size, the reflected probe will have a large portion of its intensity that is not affected by the pump heating. The closer in size the probe is to the pump, the better it will be for showing a change in intensity from pump heating, allowing for better measurement sensitivity. The probe is basically averaging the temperature rise over the area of the sample it reflects from, so it is preferred to ensure the probe is the same (or smaller) than the pump to make sure that averaging is capturing the pump and not the regions outside where no heating is occurring. The focused pump and probe diameters may be adjusted with lenses to be equivalent sizes.

While the principle of the present techniques thus far have been based on the idea of inducing an on/off state of the steady-state temperature rise (i.e., square wave modulation), many lock-in amplifiers use a pure sinusoid as a reference mixer, such that higher harmonics are not captured in detection. In this case, the lock-in only captures the magnitude of the probe signal at the fundamental frequency of the square wave, i.e., a sine wave. A regime of quasi steady-state temperature rise can be obtained via a sine wave heat source. ΔP as determined by the LIA is proportional to the amplitude of the sinusoidal component of the pump waveform. Likewise, ΔV corresponds to only the sinusoidal component of the probe waveform. LIA detection thus allows for modulation of the pump with an arbitrary periodic waveform such as square, sine, triangle, etc.

A quasi steady-state temperature rise can be used to substitute for a steady-state temperature rise. Referring back to FIG. 3C, some threshold for $\Delta T/\Delta T_{ss}$ based on a desired measurement tolerance can be obtained. For example if a ratio of 95% is used, a modulation frequency can be selected that has a period longer than the 95% rise time of the temperature rise.

Calibration-Free Embodiments

With the assumption that the proportionality constant γ is a constant, equation (2) can be used to determine the thermal conductivity, as discussed hereinabove. In practice, though, the proportionality constant γ is dependent on a number of factors such as types of the optical components used in the measurement device, the types of detection techniques used.

In another embodiment, the measurement of the thermal conductivity may be done without a calibration to determine the proportionality constant γ. Using multiple modulation frequencies enables a way to circumvent the need for this calibration. At a first modulation frequency f1, equation (2) can be written as:

$$\frac{\Delta V(f_1)}{V(f_1)\Delta P(f_1)} = m_{exp}(f_1) = \gamma \frac{\Delta T(f_1)}{\Delta |Q(f_1)|} = \gamma m_{model}(f_1)$$

At a second modulation frequency f2, equation (2) can be written as follows:

$$\frac{\Delta V(f_2)}{V(f_2)\Delta P(f_2)} = m_{exp}(f_2) = \gamma \frac{\Delta T(f_2)}{\Delta |Q(f_2)|} = \gamma m_{model}(f_2)$$

Relationship of f1 and f2 can be written as follow:

$$\frac{m_{exp}(f_1)}{m_{exp}(f_2)} = \frac{\gamma m_{model}(f_1)}{\gamma m_{model}(f_2)} = \frac{m_{model}(f_1)}{m_{model}(f_2)}$$

Or $$\frac{\Delta T(f_1)\Delta |Q(f_2)|}{\Delta |Q(f_1)|\Delta T(f_2)} = \frac{\Delta V(f_1)V(f_2)\Delta P(f_2)}{V(f_1)\Delta P(f_1)\Delta V(f_2)}$$

Using power dependent sweeps, similar to the embodiment with the calibration discussed above, at two or more unique modulation frequencies, the slopes of the power vs. reflectance data at different modulation frequencies can be used as a new data set to fit the thermal model and measure thermal conductivity.

In the two-frequency approach, steady-state thermoreflectance data is taken using two modulation frequencies that are separated enough to allow for distinct power vs. temperature trends. Because the proportionality constant relating measured data to the thermal model is independent of modulation frequency, taking the ratio of the resulting slopes of power vs. reflectance between the two frequencies is independent of any scaling factors. Consequently, the thermal conductivity can be determined without the use of a calibration sample. In the example shown in FIGS. 8A-8C, using laser 1/e2 diameters of 21 microns, 100 Hz and 1 MHz are used to measure the thermal conductivity of 80 nm Al on $Al_2O_3$, 80 nm Al on Si, and Electrolytic Iron without a thin film transducer. All measured values fall within 5% of accepted literature values and independently measured values using TDTR. For instance, electrolytic Iron is a NIST standard with thermal conductivity of 78 W m$^{-1}$ K$^{-1}$ at room temperature.

In another embodiment of calibration-free thermal conductivity measurement, a frequency sweep method is used. In an example, the modulation frequency sweeps over a range of frequencies ranging from 1 Hz to 1 GHz and fitting the data to the SSTR frequency dependent model. In this approach, the frequency-domain solution to the heat equation subjected to CW laser heating with a sinusoidal amplitude modulation is examined. The thermal model when a nonzero modulation frequency is assumed is described by equation 132. This model is compared to the measured data by normalizing the model and data at a frequency as close to zero (steady state) as possible.

With this approach, the power would remain constant but the frequency would vary the temperature rise, $\Delta T$. The modulation frequency is a term in the heat flux model, and can be a variable to tune the heat flux change.

As shown in FIG. 9, sweeping the frequency over a wide range, from 100 Hz to 200 MHz, allows mapping out the frequency response of the steady state signal. The measurement data is fitted to the thermal model. The squares represent the data with 80 nm of aluminum on $SiO_2$, while the line signifies the model of that film stack with a thermoconductivity of 1.35 W/m/K, a commonly accepted thermal conductivity for $SiO_2$.

Embodiment of Measurement System

Figure 1:
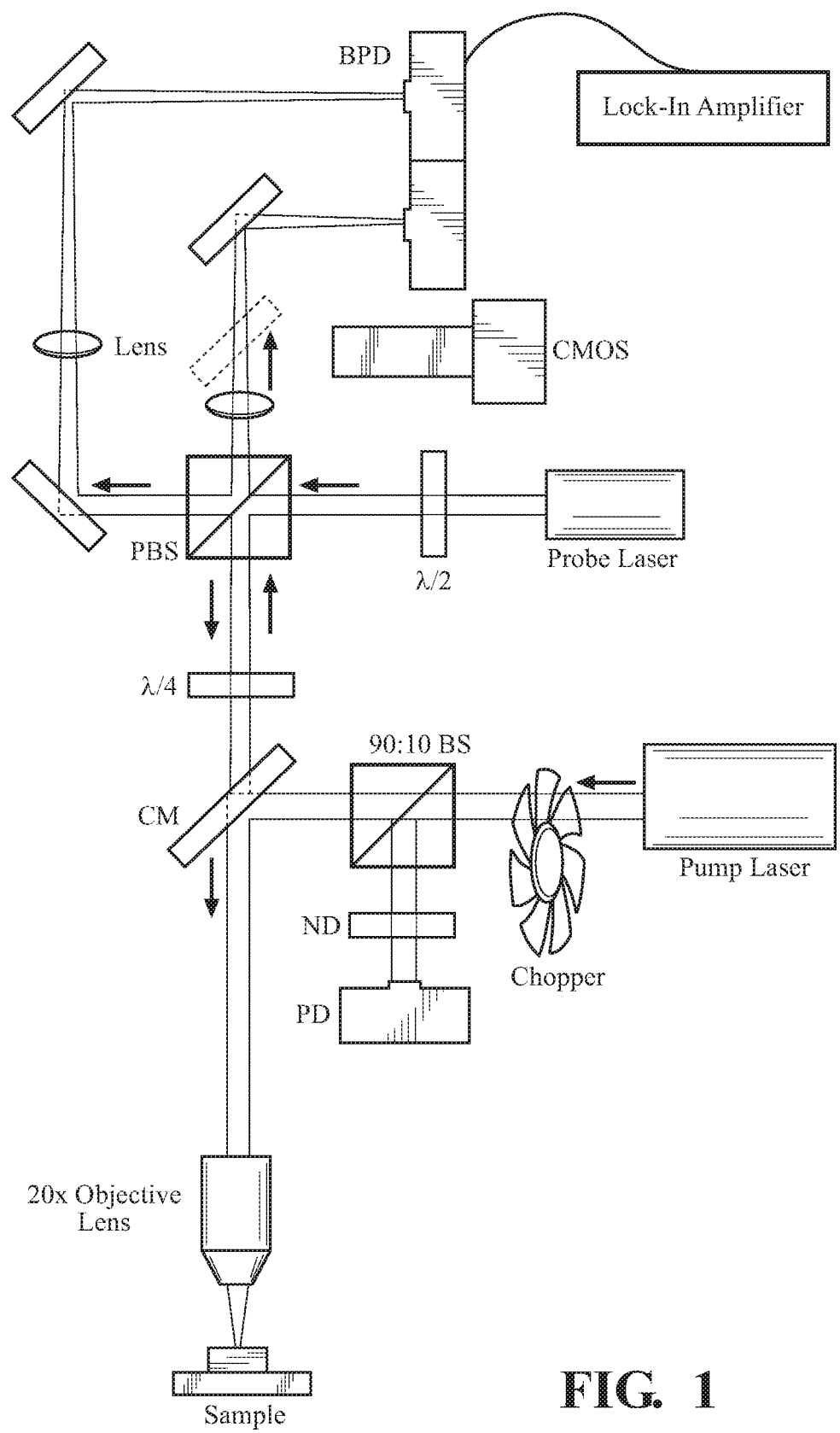
FIG. 1 is a schematic showing a steady-state thermoreflectance (SSTR) system for measuring the thermal conductivity in accordance with an embodiment of the present invention.

FIG. 1 shows an embodiment of the system for measuring the thermal conductivity using the method in accordance with embodiments of the present invention.

In this example, the present system consists of a CW diode probe laser (Coherent Cube), having a wavelength of 786 nm and output power up to 30 mW, and a CW pump laser (Spectra-Physics Millenia Vs) with a wavelength of 532 nm and output power up to 5 W. In practice, the pump power is limited to <200 mW except in the case of the most conductive materials, where output powers up to 1 W proved sufficient for the pump radii used. Likewise, the probe output is limited to <1 mW to avoid any additional heating of the sample. A mechanical chopper (Thorlabs MC2000B) is used to modulate the pump. An electro-optic modulator (Thorlabs EO-AM-NR-C4) may also be used with excellent agreement found between the two modulation sources. Ultimately, the chopper is preferred because it is simple to use, inexpensive, allows for fully on/off square waves, and has a damage threshold far exceeding the operating powers of the pump. Internal modulation of a pump laser offers a further step toward simplicity and cost reduction of the SSTR system. The pump waveform and power may be monitored by a photodetector (Thorlabs DET10A) by picking off 10% of the beam using a 90:10 (90% transmission/10% reflection) beamsplitter BS. A power meter may also be used and is sufficient for this purpose. A photodetector is preferable because it allows for sending the signal to a second oscillator in the lock-in amplifier to measure the pump power in the same way the probe is measured, i.e., with LIA or PWA detection. A neutral density (ND) filter may be placed before the pump photodetector to avoid saturation of the detector. The transmitted power is then reflected by a cold mirror CM and sent through an objective lens to focus onto the sample.

In the example shown in FIG. 1, the probe is split into two paths using a polarizing beam splitter PBS. A half-waveplate $\lambda/2$ is used to control the power of each path. The transmitted portion is used as a reference while the reflected portion passes through a quarter-wave plate $\lambda/4$ that is adjusted to allow for maximum transmission of the back-reflected probe from the sample. The probe is transmitted through the cold mirror and is focused coaxially with the pump onto the sample using an objective lens. The focused pump and probe diameters were adjusted with lenses to be equivalent sizes. Using a 20× and 10× objective lens, the 1/e$^2$ diameters are 11 μm and 20 μm, respectively, as measured via a scanning slit beam profiler (Thorlabs BP209-VIS). The probe is back-reflected to a balanced photodetector (PBD) (Thorlabs PDB410A) along with the path-matched reference beam to minimize common noise in the probe. The powers of the reference and sample beams going into the photodetector PD are adjusted to be equivalent via the half-waveplate to minimize noise.

When using the 10× objective lens, a higher order ND filter may be used to further reduce power going into the pump photodetector PD. This is done to compensate for the increased power needed to heat the sample to similar temperatures to those achieved with the 20× objective. Using a lock-in amplifier (Zurich Instruments UHFLI) synced to the chopper frequency, the magnitude ($\Delta V$) of the probe signal divided by the DC probe signal (V) is recorded simultaneously with the lock-in magnitude of the pump photodetector ($\Delta P$). $\Delta P$ as determined by the LIA is proportional to the amplitude of the sinusoidal component of the pump waveform. Likewise, $\Delta V$ corresponds to only the sinusoidal component of the probe waveform. LIA detection thus allows for modulation of the pump with an arbitrary periodic waveform (square, sine, triangle, etc.) and with any offset power to obtain the same relation between the lock-in pump power and lock-in probe magnitude. The pump power is increased linearly so that a linear relation between $\Delta V/V$ with pump power is obtained. The slope of this relation, after determining the appropriate proportionality constant, is used to determine thermal conductivity by comparing it to a thermal model given in the "Thermal models" section. Alternatively, a PWA with boxcar averager is used to record both the pump and probe waveforms over several periods of temperature oscillation by again syncing to the chopper frequency. Using this approach, we can visualize the sample temperature rise vs. time to determine the steady-state regime of the temperature rise.

Comparing the two detection schemes, the LIA approach allows for faster data acquisition, allows for full automation of both data acquisition and analysis, and is independent of the waveform used, as only the sinusoidal component is recorded. However, because sinusoidal modulation can only achieve a quasi steady-state, for accurate determination of low-diffusivity materials, (i) the modulation frequency must be lower compared with the PWA case or (ii) the thermal model must include the modulation frequency as an input parameter. The PWA approach, on the other hand, extracts the total waveform of the probe reflectivity vs. time. As such, the square wave reflectivity waveform that results from a square wave pump input can be deduced. Furthermore, data analysis is done by manually choosing the time range in which the "on" and "off" state occur, ensuring that the true steady-state temperature rise can be used for determining thermal conductivity.

Note that γ is different for different objective lenses used because (i) power loss may not be the same within the two objectives and (ii) a stronger neutral density filter is used to reduce power detected with the pump photodetector when moving from the 20× to 10× objective to avoid saturation of the detector. Additionally, γ will differ between the LIA and the PWA approaches.

FIGS. 2A-2D show examples of the not-to-scale waveforms of the pump and probe beams used in the measurement setup of FIG. 1. FIG. 2E provides a simple illustration of the thermal model used in the present invention: a material at an initial temperature rise of zero degrees at time t=0 is subjected to a temporally constant, spatially gaussian heat flux at the sample surface with heat diffusion based on the radially symmetric heat diffusion equation. FIG. 2A shows the probe waveform before being reflected from the material, which is a continuous waveform with a constant magnitude of the power. FIG. 2B shows a modulated pump waveform with cyclical "on" and "off" states. ΔP depicts pump power into the material. The pump power heats up the material and causes the temperature to rise in a semi-circular area of the material. The temperature at the heated-up region of the material changes periodically as the pump power is turned on and off periodically. Correspondingly, the power of the reflected probe beam changes, where ΔV depicts change in reflectance. Difference between Δ using the PWA and LIA for a square wave is shown in FIG. 2D; the dashed line shows the sine component to the solid square wave.

Theory: Criteria to Establish a Steady-State Temperature Rise "On" State

To establish the criteria needed to induce a steady-state temperature rise "on" state, the heat diffusion equation in the time-domain can be solved to determine the time needed for the temperature rise to reach an equilibrium, i.e., a steady-state. Using the radially symmetric heat diffusion equation, a material at an initial temperature rise of zero degrees at time t=0 is subjected to a temporally constant, spatially gaussian heat flux at the sample surface to simulate CW laser heating. A semi-infinite boundary condition is applied in all spatial dimensions. The derivation for this solution is provided in the "Thermal models" section. Two experimental parameters can be balanced to determine the operating conditions needed to achieve steady-state: the pump/probe radius and the modulation frequency of the pump. This can be seen in two common examples used as calibrations in TDTR and FDTR, silicon (Si, $\kappa \approx 140$ W m$^{-1}$ K$^{-1}$) and amorphous silicon dioxide (a-SiO$_2$, $\kappa \approx 1.4$ W m$^{-1}$ K$^{-1}$). These thermal conductivities were approximated to be exactly 100× different from one another. Three 1/e$^2$ pump/probe diameters spanning three orders of magnitude are considered: 1, 10 and 100 µm. Pump and probe sizes are equal in all example cases. FIG. 3 shows the normalized temperature rise, $\Delta T/\Delta T_{ss}$, where $\Delta T_{ss}=\Delta T(t\rightarrow\infty)$ is the steady-state temperature rise, shown for Si and a-SiO$_2$ respectively in FIGS. 3A and 3B. The solution is applied both with and without an 80 nm aluminum (Al) transducer layer.

The temperature rise asymptotes to the steady state temperature rise, but a threshold for $\Delta T/\Delta T_{ss}$ based on a desired measurement tolerance can be defined. For example if a ratio of 95% is used, a modulation frequency that has a period longer than the 95% rise time of the temperature rise can be selected. For Si, the 95% rise times for a 1/e$^2$ pump diameter of 1, 10, and 100 µm are ~10$^{-7}$, 10$^{-5}$, and 10$^{-3}$ seconds, respectively. Similarly, for a-SiO$_2$, the 95% rise time for a pump radius of 1, 10, and 100 µm are ~10$^{-5}$, 10$^{-3}$, and 10$^{-1}$ seconds, respectively. It is instructive to compare Si to a-SiO$_2$, which differ in thermal diffusivity by almost exactly two orders of magnitude. For the same pump diameter, the rise time of a-SiO$_2$ is two orders of magnitude longer than for Si. Furthermore, for both Si and a-SiO$_2$, increasing the pump diameter by one order of magnitude increases the rise time by exactly two orders of magnitude. These two correlations suggest that the nondimensional Fourier number, $Fo=\alpha t/r_0^2$, can be used, where a is the thermal diffusivity, t is time, and $r_0$ is the pump radius, to generalize these results for a universal criterion to determine the rise times for any material. FIG. 3C shows the relation between $\Delta T/\Delta T_{ss}$ and Fo, which holds true for any material having the previously defined boundary conditions.

In one embodiment, thermoreflectance measurements use a thin metal transducer. The purpose of using a transducer is two-fold. First, the transducer can serve as a calibration sample for the SSTR measurement. Usually, the calibration sample is required to have the same optical properties as the material of interest. Second, the tranducer can be used if the material of interest is transparent to the laser beam.

In addition to having significant affect on the steady-state temperature rise itself, the transducer can have significant affect on the rise time of the transient temperature rise. For example, for 80 nm Al/Si, the rise time is lower than it is without the transducer layer for all laser spot sizes, allowing for higher modulation frequencies to be used to obtain a steady-state temperature rise. Conversely, the addition of an 80 nm Al layer to a-SiO$_2$ leads to longer 95% rise times than without the transducer layer. However, in both cases, the degree to which the rise time differs from the predictable case without this transducer is entirely dependent on the pump spot size, relative mismatch in thermal properties between the transducer layer and substrate, and, to a lesser extent, the thermal boundary conductance between the transducer and substrate. In particular, as laser spot size decreases, the influence of the transducer on the rise time increases. Still, in most cases, the nondimensional relation found in FIG. 3C is a useful guide to select the maximum modulation frequency given the pump radius and a rough idea of the thermal diffusivity of a sample. Of course, in practice, one can simply select a modulation frequency as low as possible to ensure the steady-state temperature rise is reached; the advantage to using higher modulation frequencies, if possible, is to reduce 1/f noise and expedite testing times.

Quasi Steady-State Via a Sine Wave Heat Source

As shown in FIGS. 4A-4C, the frequency-domain solution to the heat equation subjected to CW laser heating with a sinusoidal amplitude modulation is examined. The normalized temperature rise, $\Delta T/\Delta T_{ss}$, is shown for a-SiO$_2$, crystalline sapphire (Al$_2$O$_3$), Si, and diamond with 80 nm Al transducers. The solutions are shown for 1/e$^2$ pump and probe diameters of 1 µm, 10 µm, and 100 µm in FIGS. 4A, 4B, and 4C, respectively. The temperature rise ΔT is the modulated temperature rise that varies sinusoidally at the same frequency as the laser heat source, but its magnitude asymptotes to a constant value, that of the steady-state temperature rise, as the modulation frequency approaches zero. Smaller laser spot sizes allow for a quasi steady-state temperature rise to be reached at higher modulation frequencies. Thus, higher modulation frequencies and smaller spot sizes can be exploited to reduce 1/f noise at lower frequencies.

Sample Materials Used for Measurements

Samples tested include two types of a-SiO$_2$, a plain glass microscope slide (Fisherbrand) and a 3 mm thick Borosilicate Glass (BK7) optical window (Thorlabs WG10530); a 1 mm thick quartz wafer (Precision Micro Optics); two types of Al$_2$O$_3$, a 300 μm thick wafer (UniversityWafer) and a 3 mm thick window (Thorlabs WG30530); two types of Si, a 300 μm thick wafer (UniversityWafer) and a 3 mm thick window (Thorlabs WG80530); a 300 μm thick nitrogen-doped, n-type 4H-silicon carbide (4H—SiC) wafer (MTI Corporation); and a 300 μm thick polycrystalline diamond wafer (Element Six™200).

Periodic Waveform Analyzer/Boxcar Average

In one embodiment, data can be collected using the PWA via a digital boxcar averager while modulating the pump beam with a chopper at 100 Hz. Using two independent oscillators, the pump and probe waveforms can be simultaneously recorded over a phase space divided into 1024 bins. The reference frequency is provided by the chopper. The resulting waveforms, which have been converted from phase space to time, are shown for the pump in FIGS. 5A-5F, while those of the probe are shown in FIGS. 6A-6F. The six samples shown include (a) an a-SiO$_2$ glass slide, (b) z-cut quartz, (c) Al$_2$O$_3$, (d) Si, (e) 4H—SiC and (f) diamond. The modulation frequency was kept at 100 Hz in all cases and a 20× objective lens was used, corresponding to 1/e$^2$ pump/probe diameters of 11 μm. Each waveform may be generated by averaging over 5 minutes of real time data acquisition.

As expected, the pump waveform shows a perfect on/off square wave. Note that the magnitude is increased when moving to higher thermal conductivity materials to allow for the probe waveform to reach approximately the same magnitude in each sample. The probe waveforms reveal that for all samples except a-SiO$_2$, a clear steady-state temperature rise is obtained as indicated by the near-square waveform. By comparison, a-SiO$_2$ has a relatively long-lived transient temperature rise, but reaches our steady-state threshold by the end of the waveform. The advantage of PWA analysis is that the signal difference between "on" and "off" state (ΔV) is chosen manually, so that we can neglect the transient portions of the temperature rise (however small) and only extract the steady-state regime. This is achieved through a MATLAB script in which the range of time is picked to extract signal in the "on" state and "off" state and subtract the mean signal of each state. The difference corresponds to ΔV. The mean "on" and "off" signals chosen for each case are displayed as dashed lines in FIGS. 6A-6F. The same process may be repeated for the pump waveform, where the difference between high and low waveform states corresponds to ΔP. With γ defined using a calibration, this is all the information needed to determine thermal conductivity via a purely steady-state model (i.e., modulation frequency=0 in the model).

Lock-In Amplifier

In another embodiment, data is collected via the LIA. To do so, the chopper reference frequency is used to lock into the periodic signal produced by the reflected probe. Using an automated program to control the pump power via serial command, the magnitude of probe lock-in voltage is locked as a function of 10 powers. FIGS. 7A and 7B show the resulting relationship between ΔV/V and proportional pump power (ΔP) for two objective lenses, 10× and 20×. The lock-in time constant used is 400 ms and each datapoint represents the average over ~10 seconds of acquisition. The data shown include those from 3 to 5 spots on each sample, which is the primary reason for any visible noise observed. Each 10-data point scan takes about 2 to 3 minutes to run; this time is primarily dictated by the wait time allowed to adjust the pump power. However, after characterizing the noise floor, in principle only a single data point is needed to establish a slope, suggesting the data acquisition time is limited only by the time to reach a steady lock-in magnitude.

A linear fit is performed on each dataset to determine the slope, ΔV/(V ΔP). From this, the thermal conductivity can be determined by comparing this slope to a thermal model after dividing by γ. FIGS. 7A and 7B show the expected slopes for a material having thermal conductivity of 1, 10, 100, and 1000 W m$^{-1}$ K$^{-1}$. Comparing these lines with our experimental data, it can be seen that the test samples' slopes fall in line with what is expected for each substrate. For these models, an Al transducer thermal conductivity is assumed that is descriptive of what is measured via four point probe resistivity measurements, ~100 W m$^{-1}$ K$^{-1}$, a constant thermal boundary conductance of 200 MW m$^{-2}$ K$^{-1}$ and modulation frequency of 100 Hz. To determine the impact of these assumptions, sensitivity to the model parameters, is determined and described below.

Parameter Sensitivity

The sensitivity, $S_x$, of the thermal model to parameter x is quantified using a similar approach to that defined by Yang et al. by varying x plus or minus 10%. (J. Yang, C. Maragliano, and A. J. Schmidt, Rev. Sci. Instrum. 84, 104904 (2013)) Since magnitude instead of phase is measured, an additional division term is added to allow for fair comparison of sensitivities between samples. Thus, $$S_x = \frac{|\Delta T_{1.1x}(r_{01}) - \Delta T_{0.9x}(r_{01})|}{\Delta T_x(r_{01})}, \quad (4)$$

where $\Delta T_x$ is the temperature rise calculated for input parameter x and $r_{01}=\sqrt{r_0^2+r_1^2}$, where $r_0$ and $r_1$ are the pump and probe radii, respectively. Sensitivity is defined as a function of $r_{01}$ to show that we gain sensitivity to different parameters by utilizing multiple pump/probe diameters. FIGS. 10A-10C show the sensitivity as a function of $r_{01}$ for four parameters, in-plane transducer thermal conductivity ($\kappa_{r,1}$), transducer thickness ($d_1$), sample thermal conductivity ($\kappa_2=\sqrt{\kappa_{r,2}\kappa_{z,2}}$), and thermal boundary conductance (G) between the transducer and substrate. The $r_{01}$ used in our experiments are shown as dashed lines. Three samples are considered: (a) a-SiO$_2$, (b) Al$_2$O$_3$, and (c) diamond. Amorphous silica and diamond were chosen to display because they represent the lower and upper extremes of thermal conductivity measured in this study. For Al$_2$O$_3$, sensitivity of the thermal model is overwhelmingly dictated by $\kappa_2$, demonstrating why Al$_2$O$_3$ is a great calibration sample to determine γ. For a-SiO$_2$, $\kappa_2$ again is the most sensitive parameter to our thermal model for the $r_{01}$ used in experiment. However, it can be seen that sensitivity to $\kappa_{r,1}$ and $d_1$ are still somewhat significant. These two quantities (and their corresponding uncertainties) were measured via four point probe resistivity measurements and mechanical profilometry, respectively. Sensitivity to G (not shown) was not significant at all in this case.

For diamond, for the $r_{01}$ used in experiment, the measurement is highly sensitive to G. Therefore, in order to determine diamond's thermal conductivity, an accurate measurement for G is necessary. To obtain this quantity, the different sensitivities to $\kappa_2$ and G at different $r_{01}$ values are exploited to determine both $\kappa_2$ and G. This procedure is performed for silicon (both the thin wafer and the thick window), 4H—SiC, and diamond. After determining $\Delta V/(V\ \Delta P)$ and converting to $\Delta T/\Delta|Q|$ via $\gamma$, G is adjusted in the thermal model and the best fit $\kappa_2$ is determined. Repeating this procedure for two objective lenses results in two distinct curves describing $\kappa_2$ vs G; the intersection of these curves represents the true values of $\kappa_2$ and G. The results are shown in FIGS. 11A-11C for (a) silicon, (b) 4H—SiC, and (c) diamond. For silicon, the thermal boundary conductances are different between the wafer and the window. This may be due to extrinsic effects such as roughness, surface finish, or variations in native oxide thickness. Nonetheless, the thermal conductivity is found to be equivalent in both samples, at ~135 W m$^{-1}$ K$^{-1}$, in agreement with literature values. (R B. Wilson and D. G. Cahill, *Appl. Phys. Lett.* 107, 203112 (2015)).

Likewise, for 4H—SiC and diamond, G and $\kappa_2$ are determined based on the intersection of the curves for the 10× and 20× objectives. Note, this approach can be avoided by running experiments at larger pump/probe spot sizes to become insensitive to G entirely. This approach was not needed for any other samples tested, since those measurements were not sensitive to thermal boundary conductance.

Experiment Results

The measured thermal conductivities for all samples tested are listed in Table 1. Results are shown for SSTR using both the PWA/Boxcar and LIA signal analysis approaches to reveal that the two approaches agree with one other. To confirm the accuracy of these measurements, Table 1 also shows the thermal conductivities for the same samples obtained using TDTR, as well as reported thermal conductivities in the literature. FIG. 14 shows the measured thermal conductivities vs. literature thermal conductivities spanning over three orders of magnitude. Overall, excellent agreement is observed between literature values and the measured thermal conductivities using both SSTR and TDTR. Because SSTR fundamentally measures $\sqrt{\kappa_z \kappa_r}$, for the case of anisotropic materials, the reported values for $\kappa$ are equivalent to $\sqrt{\kappa_z \kappa_r}$. To obtain $\kappa_z$ and $\kappa_r$ independently in TDTR, for 4H—SiC, the methodology outlined is followed using a relatively large pump diameter of ~20 μm and high modulation frequency of 8.4 MHz to determine $\kappa_z$, followed by a smaller pump diameter of ~10 μm and low modulation frequency of 1.0 MHz to determine Kr. Using this approach, it is found that $\kappa_z$=299±33 W m$^{-1}$ K$^{-1}$ and $\kappa_r$=350±64 W m$^{-1}$ K$^{-1}$. Noting that the 4H—SiC sample measured is N-doped at a level somewhere between $10^{18}$ and $10^{19}$ cm$^{-3}$. For quartz, the thermal diffusivity is too low to enable sensitivity to Kr; instead, K with TDTR is determined using two samples: z-cut and y-cut quartz. It is found that for z-cut quartz, $\kappa_r$=11.63±0.80 W m$^{-1}$ K$^{-1}$, while $\kappa_z$=6.45±0.46 W m$^{-1}$ K$^{-1}$ for y-cut quartz (equal to Kr for z-cut quartz). Thus, K is equal to 8.66±0.61 as determined by TDTR, in excellent agreement with that determined by SSTR.

TABLE 1

| Sample | It (W m$^{-1}$ K$^{-1}$), | It (W m$^{-1}$ K$^{-1}$), | It (W m$^{-1}$ K$^{-1}$), |
| --- | --- | --- | --- |
| a-SiO2 glass | 1.13 ± 0.08 | 1.06 ± 0.08 | 1.3, ref 3 |
| a-SiO2 BK7 | 1.12 ± 0.08 | 1.07 ± 0.09 | 1.06, ref 21 |
| Quartz | 8.63 ± 0.36 | 8.63 ± 0.36 | 8.6, ref. 22 |
| Al2O3 wafer | 35.0 ± 1.4 | 35.2 ± 1.4 | 34, ref. 20 |
| Al2O3 window | 35.1 ± 1.4 | 34.8 ± 1.4 | 34, ref. 20 |
| Silicon wafer | 133 ± 6 | 136 ± 7 | 133, ref. 20 |
| Silicon window | 135 ± 10 | 136 ± 11 | 133, ref. 20 |
| 4H-SiC | 310 ± 23 | 335 ± 28 | 391, ref. 23 |
| Diamond | 1760 ± 390 | 2270 ± 550 | 1900, ref 24 |

One possible discrepancy between SSTR and literature is observed in the case of a-SiO$_2$. Although a commonly accepted literature thermal conductivity for glass of 1.3 W m$^{-1}$ K$^{-1}$ is referenced, note that reported values range from 1 to 1.4 W m$^{-1}$ K$^{-1}$ for glass depending on the chemistry and density; in the present case, a negligible difference is measured between the glass microscope slide and the BK7 window. In TDTR, 1.37 W m$^{-1}$ K$^{-1}$ for a-SiO$_2$ is measured, but because TDTR requires a known heat capacity to determine thermal conductivity, any discrepancy between the assumed value for volumetric heat capacity (1.66 MJ m$^{-3}$ K$^{-1}$) and the actual value (which is density-dependent) could explain the difference in values obtained between the two techniques. To prove this point, TDTR and SSTR provide a similar thermal conductivity for BK7, but BK7 has a higher volumetric heat capacity than a-SiO$_2$.

Finally, note that the thermal conductivity of diamond has relatively large uncertainty. This is in part due to the limited temperature rise achievable in the material, resulting in a relatively low signal-to noise ratio. However, by taking multiple measurements at the same spot on the sample, it is determined that this alone would only account for ~5-10% of the uncertainty. Uncertainty in thermal boundary conductance adds another significant contribution, as revealed in FIGS. 11A-11C Finally, note that there is significant variation between different spots on the sample; measured thermal conductivities varied as much as ~25% from the mean. This variation could be due to local thermal conductivity reduction from grain boundaries. Sood et al. showed that local thermal conductivities in CVD-grown boron-doped polycrystalline diamond (average grain size of 23 μm) can decrease K by nearly 60% near grain boundaries. (A. Sood, R. Cheaito, T Bai, H. Kwon, Y. Wang, C. Li, L. Yates, T Bougher, S. Graham, M. Asheghi, M Goorsky, and K. E. Goodson, *Nano Letters, Nano Letters* (2018), 10.102/acs.nanolett.8b00534) Because grain sizes in the diamond measured in this study range from 10 to 100 μm, it is not expected to see the same extent of variation observed by Sood et al.

Sources of Uncertainty

Because SSTR relies on the proportionality constant, $\gamma$, it is helpful to characterize $\gamma$ and its uncertainty with accuracy. To determine uncertainty in $\gamma$, a Monte Carlo approach is used to randomly vary input parameters to the thermal model based on their corresponding uncertainties. These parameters include the transducer thickness, $d_1$ (80±3 nm); transducer thermal conductivity, $\kappa_{r,1}$ (100±5 W m$^{-1}$ K$^{-1}$); substrate thermal conductivity, $\kappa_2$ (for Al$_2$O$_3$, 35±2 W m$^{-1}$ K$^{-1}$); transducer/substrate thermal boundary conductance, G (for Al/Al$_2$O$_3$, 250±30 MW m$^{-2}$ K$^{-1}$); and effective radius, $r_{01}$ (assumed 5% uncertainty). Additionally, experimental uncertainty is included in determining ($\Delta V/V\ \Delta P$). For the LIA analysis, this was determined by the standard deviation of the best fit slope to experimental data, while in the PWA case it was determined by the standard deviation of the signal in both the "on" and "off" states. Iterating over $10^5$ simulations, a standard deviation of <5% of the mean is obtained. The same approach was used to characterize uncertainties of the samples tested in this study. Assuming the independence of parameters simplifies the uncertainty analysis, so that the uncertainty is $\Delta \approx \Sigma_i \Delta_i^2$, where $\Delta_i$ is the uncertainty in κ resulting from uncertainty in parameter i. The reported uncertainties are listed in Table 1.

Signal noise comes primarily from 1/f noise. Using low probe powers, high pump powers, and longer averaging and/or lock-in times can help to overcome this noise, but ultimately there is a lower limit to the frequency that can be detected with a sufficient signal-to-noise ratio. A digital oscilloscope is used to observe, in the frequency domain, the magnitude of $\Delta V$ compared to the noise floor. For the highest pump powers used in each case, the signal-to-noise ratio was anywhere from 10 to 100. Lock-in amplification and/or boxcar averaging further facilitated signal extraction.

For uncertainty resulting from model parameters, sensitivity to these parameters dictates the magnitude of their contributions to total uncertainty. For low thermal conductivity materials, transducer thickness and thermal conductivity can be relatively significant, while for higher thermal conductivity materials the interface conductance can be significant.

Thin Film Measurement Sensitivity

While the discussion and experimental results have been focused on the measurement of bulk substrates, note that thin film thermal conductivities can be measured under the right conditions. In FIGS. 15A-15I, the relative sensitivities to thermal parameters of a three-layer model (layer 1: 80 nm transducer/layer 2: film/layer 3: substrate) are shown as a function of layer 2 film thickness, assuming a 10× objective lens is used so that the pump and probe diameters are 20 μm (radii are 10 μm). Due to the sensitivity of SSTR measurements being highly dependent on the relative properties of film and substrate, $\kappa_2$ and $\kappa_3$ are varied in combinations of 1, 10, and 100 W m$^{-1}$ K$^{-1}$ for a total of nine cases. Sensitivities are shown for both in-plane (r) and cross-plane (z) directions, as well as for transducer/film and film/substrate thermal boundary conductances ($G_1$ and $G_2$, respectively).

Quantifying the thickness at which SSTR can measure $\kappa_2$ as the thickness at which sensitivity to this parameter surpassing $\kappa_3$, it is found that highly dissimilar $\kappa_2$ and $\kappa_3$ allow for such measurement as low as <100 nm, two orders of magnitude below the measurement characteristic length scale defined by the pump radius. Interestingly, whereas for bulk materials SSTR maintains the same sensitivity to $\kappa_{r,2}$ and $\kappa_{z,2}$, for thin films this is not the case. For a thermally conductive film on an insulating substrate, SSTR becomes highly sensitive to $\kappa_{r,2}$, whereas for a thermally insulating film on conductive substrate, $\kappa_{z,2}$ becomes the dominant thermal parameter in the model. At the other extreme, when film and substrate K are highly similar, sensitivity to $\kappa_2$ does not surpass $\kappa_3$ until close to 10 μm, i.e., the pump radius. In this case, symmetry in the temperature profile between the z and r directions is preserved so that sensitivity to $\kappa_2$ and $\kappa_3$ are equivalent, barring minor influence from $G_2$. Cleary, measurement of thin films is facilitated by strong differences in film and substrate K. Still, even in the worst-case scenario in which these thermal conductivities are equal, the critical film thickness that can be measured, is about equal to the pump radius. Consequently, reducing the pump/probe radii via higher objective lenses becomes an option for improving sensitivity to thin film thermal conductivities.

Thermal Models

Mathematical Description of the Transient Temperature Rise

In Braun et al. (J. L. Braun and P. E. Hopkins, *J. Appl. Phys.* 121, 175107 (2017)), an expression is derived to describe the surface temperature induced by a heating event with an arbitrary time-dependence. The temperature of the top surface as a function of radius and time, is $$T_{top}(r,\ t) = \frac{1}{2\pi} \int_{-\infty}^{\infty} \tilde{L}(r,\ \omega)\tilde{G}(\omega)e^{i\omega t}d\omega, \tag{A1}$$

where $\tilde{L}(r,\ \omega)$ is a function of radius, r, and angular frequency, ω. $\tilde{L}(r,\ \omega)$ incorporates the heating radius and material properties of the sample and $\tilde{G}(\omega)$ is the Fourier transform of the function describing the time dependence of the heat source. $\tilde{L}(r,\ \omega)$ is given by $$\tilde{L}(r,\ \omega) = -\frac{1}{2\pi_0} \int_0^\infty \left(\frac{D(k,\ \omega)}{C(k,\ \omega)}\right) \exp\left(-\frac{k^2 r_0^2}{8}\right) J_0(kr)k dk. \tag{A2}$$

Although given in Braun et al., for the sake of completeness we define C and D, which are defined in the Hankel and frequency domains, based on the transfer matrix terms $$\begin{bmatrix} A(k,\ \omega) & B(k,\ \omega) \\ C(k,\ \omega) & D(k,\ \omega) \end{bmatrix} = \prod_{i=n,n-1,\ldots}^{i=1} M_i N_i, \tag{A3}$$

$$M_i = \begin{bmatrix} \cosh(q_i L_i) & -\frac{1}{q_i \kappa_z}\sinh(q_i L_i) \\ -q_i \kappa_z \sinh(q_i L_i) & \cosh(q_i L_i) \end{bmatrix}, \tag{A4}$$

$$N_i = \begin{bmatrix} 1 & -\frac{f(i)}{G_{i-1,i}} \\ 0 & 1 \end{bmatrix}, \tag{A5}$$

$$f(i) = \begin{cases} 1 & i \neq 1 \\ 0 & i = 1, \end{cases} \tag{A6}$$

$$q_i^2 = \frac{1}{\kappa_{z,i}}(i\omega \rho_i c_{p,i} + \kappa_{r,i} k^2), \tag{A7}$$

where n is the number of layers in the material stack of the sample (for bulk materials with a transducer this is two layers), Li is the thickness of layer i, $G_{i-1,i}$ is the thermal boundary conductance between layers i and i−1, $\kappa_z$ and $\kappa_r$ are the through- and cross-plane thermal conductivities, respectively, ρ is mass density, $c_p$ is specific heat capacity, and k is the Hankel transform variable. In the present invention, the same procedure is followed to determine the solution to the transient response, but modify the surface heat flux boundary condition to start at time t=0. To do so, the Heaviside step function, u(t) is applied, so that the source term for a CW source becomes $$G(t) = A_0 u(t), \tag{A8}$$

where $A_0$ is the absorbed power. The Fourier transform is $$\tilde{G}(\omega) = A_0 \pi \left( \frac{1}{i\pi\omega} + \delta(\omega) \right). \tag{A9}$$

Substituting Eq. (A9) into Eq. (A1), the surface temperature becomes $$T_{top}(r, t) = \frac{A_0}{2} \int_{-\infty}^{\infty} \tilde{L}(r, \omega) \left( \frac{1}{i\pi\omega} + \delta(\omega) \right) e^{i\omega t} d\omega = \tag{A10}$$

$$\frac{A_0}{2} \int_{-\infty}^{\infty} \frac{\tilde{L}(r, \omega) e^{i\omega t}}{i\pi\omega} d\omega + \frac{A_0}{2} \int_{-\infty}^{\infty} \tilde{L}(r, \omega) \delta(\omega) e^{i\omega t} d\omega =$$

$$\frac{A_0}{2} \int_{-\infty}^{\infty} \frac{\tilde{L}(r, \omega) e^{i\omega t}}{i\pi\omega} d\omega + \frac{A_0}{2} \tilde{L}(r, 0).$$

Integration is done numerically. In order to simplify the integration procedure, $\tilde{L}(r, \omega)$ is expanded so that the first term in Eq. (A10) becomes $$\frac{A_0}{2} \int_{-\infty}^{\infty} \frac{\tilde{L}(r, \omega) e^{i\omega t}}{i\pi\omega} d\omega = \tag{A11}$$

$$\frac{-A_0^{\infty}}{4\pi_{-\infty}} \left( \int_0^{\infty} \left( \frac{Q(k, \omega)}{C(k, \omega)} \right) \exp\left( -\frac{k^2 r_0^2}{8} \right) J_0(kr) k dk \right) \frac{e^{i\omega t}}{i\pi\omega} d\omega =$$

$$\frac{-A_0^{\infty}}{4\pi_0} \left( \int_{-\infty}^{\infty} \left( \frac{Q(k, \omega)}{C(k, \omega)} \right) \frac{e^{i\omega t}}{i\pi\omega} d\omega \right) \exp\left( -\frac{k^2 r_0^2}{8} \right) J_0(kr) k dk =$$

$$\frac{A_0^{\infty}}{4\pi_0} \tilde{P}_t(k, t) \exp\left( -\frac{k^2 r_0^2}{8} \right) J_0(kr) k dk,$$

where $\tilde{P}_t$ is a time-dependent function defined by $$\tilde{P}_t(k, t) = -\int_{-\infty}^{\infty} \left( \frac{Q(k, \omega)}{C(k, \omega)} \right) \frac{e^{i\omega t}}{i\pi\omega} d\omega. \tag{A12}$$

The final term in Eq. (A10) can be shown to take a similar form so that $$\frac{A_0}{2} \tilde{L}(r, 0) = \frac{A_0^{\infty}}{4\pi_0} \tilde{P}_0(k) \exp\left( -\frac{k^2 r_0^2}{8} \right) J_0(kr) k dk \tag{A13}$$

where $\tilde{P}_0(k)$ is a time-independent function defined by $$\tilde{P}_0(k) = -\int_{-\infty}^{\infty} \left( \frac{Q(k, \omega)}{C(k, \omega)} \right) e^{i\omega t} \delta(\omega) d\omega = -\frac{Q(k, 0)}{C(k, 0)}. \tag{A14}$$

The probe-averaged change in reflectance is the integration over the gaussian intensity in real space. This probe averaged temperature rise, $T_{PA}$ is given by $$T_{PA}(t) = \frac{4}{r_1^2} \int_0^{\infty} T_{top}(r, t) \exp\left( -\frac{2r^2}{r_1^2} \right) r dr. \tag{A15}$$

This expression can then be simplified to $$T_{PA}(t) = \frac{4}{r_1^2} \int_0^{\infty} \left[ \frac{A_0}{4\pi} \int_0^{\infty} (\tilde{P}_t(k, t) + \tilde{P}_0(k, t)) \exp\left( -\frac{k^2 r_0^2}{8} \right) J_0(kr) k dk \right] \tag{A16}$$

$$\exp\left( \frac{-2r^2}{r_1^2} \right) r dr = \frac{A_0}{2} \int_0^{\infty} (\tilde{P}_t(k, t) + \tilde{P}_0(k, t))$$

$$\exp\left( -\frac{k^2 r_0^2}{8} \right) \left[ \frac{2}{\pi r_1^2} \int_0^{\infty} J_0(kr) \exp\left( \frac{-2r^2}{r_1^2} \right) r dr \right] k dk =$$

$$\frac{A_0}{2} \int_0^{\infty} (\tilde{P}_t(k, t) + \tilde{P}_0(k, t)) \exp\left( -\frac{k^2 r_0^2}{8} \right) \left[ \frac{1}{2\pi} \exp\left( -\frac{k^2 r_1^2}{8} \right) \right] k dk =$$

$$\frac{A_0}{4\pi} \int_0^{\infty} (\tilde{P}_t(k, t) + \tilde{P}_0(k, t)) \exp\left( -\frac{k^2 (r_0^2 + r_1^2)}{8} \right) k dk.$$

With $P_0$ and $P_t$ defined above, it straightforward to numerically integrate this expression to obtain the transient temperature rise.

Frequency-Domain and Steady-State Temperature Rise

The frequency domain solution to the temperature rise is given by $$T_{top}(r, \omega) = \tilde{L}(r, \omega)) \tilde{G}(\omega). \tag{B1}$$

For an amplitude modulated CW laser heat source at frequency $\omega_0/2\pi$, $\tilde{G}(\omega) = A_0 e^{i\omega_0 t} + A_1$, where $A_0$ is the amplitude of the modulated power absorbed by the sample, which is proportional to the power detected via pump lock-in detection, and $A_1$ is the average power absorbed. Since the lock-in technique relies on a periodic signal, the $A_1$ term is ignore in the subsequent equations. Furthermore, it is assumed that lock-in amplification effectively rejects all other frequencies except the modulation frequency. Expanding Eq. (B1) and following the same procedure used in Eq. (A16), the probe-averaged temperature rise is $$T_{top}(\omega_0) = -\frac{A_0}{2\pi} \int_0^{\infty} \frac{Q(k, \omega_0)}{C(k, \omega_0)} \exp\left( -\frac{k^2(r_0^2 + r_1^2)}{8} \right) k dk. \tag{B2}$$

The steady-state temperature rise is determined by setting $\omega_0 = 0$. As is shown in FIGS. 4A-4C, as $\omega_0 \rightarrow 0$, the amplitude of temperature rise (proportional to the probe lock-in magnitude) approaches that of the steady-state temperature rise, such that the steady-state condition may be assumed. However, for certain samples or experimentally limited spot sizes/frequencies, this assumption may not be true. Therefore, when determining thermal conductivity via the LIA approach it is generally a good idea to include the nonzero experimental modulation frequency in the thermal model, since even if the steady-state approximation is entirely valid, the model will still reflect this. For the PWA approach, however, a purely steady-state model only ($\omega_0 = 0$) is used, since the waveform is displayed in time to enable picking the regime of steady-state temperature rise.

As will be clear to those of skill in the art, the embodiments of the present invention illustrated and discussed herein may be altered in various ways without departing from the scope or teaching of the present invention. Also, elements and aspects of one embodiment may be combined with elements and aspects of another embodiment. It is the following claims, including all equivalents, which define the scope of the invention.

The invention claimed is:

1. A method of measuring a thermal conductivity of a material, the method comprising:
focusing a pump beam having pump beam a diameter and a power at a spot on a surface of the material of a size of the pump beam diameter, the pump beam having a modulation frequency that induces a cyclical steady-state temperature rise in the spot of the material, the pump beam providing a radial heat flux to the material, the cyclical steady-state temperature rise being related to the radial heat flux by a thermal model, the thermal model being a function of the thermal conductivity of the material;
focusing a probe beam having a probe beam diameter at the spot of the material and generating a reflected probe beam reflected from the spot of the material, the reflected probe beam having a reflectance signal, a magnitude of the reflectance signal being a function of the temperature of the material, and the magnitude of the reflectance signal being periodic corresponding to the cyclical steady-state temperature rise;
measuring the magnitude of the reflectance signal of the reflected probe beam with a photodetector, the measured magnitude of the reflectance signal and the power of the pump beam being related to the cyclical steady-state temperature rise and the radial heat flux by a proportionality constant;
calibrating the proportionality constant with a transducer made of a material having a known thermal conductivity; and
determining the thermal conductivity of the material by fitting the power of the pump beam and the measured magnitude of the reflectance signal to the thermal model by the calibrated proportionality constant, the thermal model being a function of the modulation frequency and the pump and probe beam diameters.

2. The method of claim 1, wherein the pump beam is a continuous-wave laser beam and modulated by an arbitrary periodic waveform.

3. The method of claim 1, wherein the probe beam is a continuous-wave laser beam.

4. The method of claim 1, wherein the material is a bulk material.

5. The method of claim 1, wherein the material used for the calibration is single-crystal sapphire.

6. The method of claim 1, wherein the probe beam diameter is the same as or smaller than the pump beam diameter.

7. The method of claim 1, wherein the material is a three layer structure including a transducer, a thin film, and a substrate.

8. The method of claim 1, further comprising:
varying the power of the pump beam;
measuring a change of the magnitude of the reflectance signal as the power of the pump beam is varied;
generating a dataset of the magnitude of a reflectance signal difference versus the power of the pump beam;
performing a linear fit on the dataset to determine a slope; and
determining the thermal conductivity by comparing the slope to the thermal model after dividing by the proportionality constant.

9. The method of claim 8, wherein the power of the pump beam is increased linearly.

10. A method of measuring a thermal conductivity of a material, the method comprising:
focusing a pump beam having a diameter and a power at a spot on a surface of the material of a size of the pump beam diameter, the pump beam having a modulation frequency that induces a cyclical steady-state temperature rise in the spot of the material, the pump beam providing a radial heat flux to the material;
focusing a probe beam having a diameter at the spot of the material and generating a reflected probe beam reflected from the spot of the material, the reflected probe beam having a reflectance signal, a magnitude of the reflectance signal being a function of the temperature of the material, and the magnitude of the reflectance signal being periodic corresponding to the cyclical steady-state temperature rise;
measuring the magnitude of the reflectance signal of the reflected probe beam; and
determining the thermal conductivity of the material by fitting the power of the pump beam and the measured magnitude of the reflectance signal to a thermal model, the thermal model being a function of a thermal conductivity of the material relating the radial heat flux to the cyclical steady-state temperature rise, and the thermal model being a function of the modulation frequency and the pump and probe beam diameters,
wherein the magnitude of the reflectance signal of the reflected probe beam is measured using a periodic waveform analyzer via a digital boxcar average.

11. A method of measuring a thermal conductivity of a material, the method comprising:
focusing a pump beam having a diameter and a power at a spot on a surface of the material of a size of the pump beam diameter, the pump beam having a modulation frequency that induces a cyclical steady-state temperature rise in the spot of the material, the pump beam providing a radial heat flux to the material;
focusing a probe beam having a diameter at the spot of the material and generating a reflected probe beam reflected from the spot of the material, the reflected probe beam having a reflectance signal, a magnitude of the reflectance signal being a function of the temperature of the material, and the magnitude of the reflectance signal being periodic corresponding to the cyclical steady-state temperature rise;
measuring the magnitude of the reflectance signal of the reflected probe beam; and
determining the thermal conductivity of the material by fitting the power of the pump beam and the measured magnitude of the reflectance signal to a thermal model, the thermal model being a function of a thermal conductivity of the material relating the radial heat flux to the cyclical steady-state temperature rise, and the thermal model being a function of the modulation frequency and the pump and probe beam diameters,
wherein the modulation frequency defines a period longer than a 95% rise time of the temperature rise.

12. A method of measuring a thermal conductivity of a material, the method comprising:
focusing a pump beam having a diameter and a power at a spot on a surface of the material of a size of the pump beam diameter, the pump beam having a modulation frequency that induces a cyclical steady-state temperature rise in the spot of the material, the pump beam providing a radial heat flux to the material;
focusing a probe beam having a diameter at the spot of the material and generating a reflected probe beam reflected from the spot of the material, the reflected probe beam having a reflectance signal, a magnitude of the reflectance signal being a function of the temperature of the material, and the magnitude of the reflectance signal being periodic corresponding to the cyclical steady-state temperature rise;

measuring the magnitude of the reflectance signal of the reflected probe beam; and determining the thermal conductivity of the material by fitting the power of the pump beam and the measured magnitude of the reflectance signal to a thermal model, the thermal model being a function of a thermal conductivity of the material relating the radial heat flux to the cyclical steady-state temperature rise, and the thermal model being a function of the modulation frequency and the pump and probe beam diameters, wherein the pump beam diameter is lowered allowing for the cyclical steady-state temperature rise to be reached at a higher modulation frequency.

13. A system for measuring a thermal conductivity of a material, comprising:

a pump radiation source for emitting a pump beam having a diameter and a power, the pump beam providing a radial heat flux to the material and modulated at a modulation frequency that induces a cyclical steady-state temperature rise on a spot of the material, the spot having a size of the pump beam diameter, the cyclical steady-state temperature rise being related to the radial heat flux by a thermal model, the thermal model being a function of the thermal conductivity of the material;

a probe radiation source for emitting a probe beam having a diameter at the spot of the material and generating a reflected probe beam reflected from the spot of the material, the reflected probe beam having a reflectance signal, a magnitude of the reflectance signal being a function of the temperature of the material, and the magnitude of the reflectance signal being periodic corresponding to the cyclical steady-state temperature rise;

detectors for measuring a waveform and the power of the pump beam and a waveform and the magnitude of the reflectance signal of the reflected probe beam;

optical components for directing and focusing the pump beam and probe beam onto a surface of the material;

a processing unit for calculating the thermal conductivity by fitting the measured pump beam power and the measured magnitude of the reflectance signal to the thermal model, the thermal model being a function of the modulation frequency and the pump and probe beam diameters; and a periodic waveform analyzer with a digital boxcar averager for recording the waveform and the power of the pump beam and the waveform and the magnitude of the reflectance signal of the reflected probe beam provided by the detectors.

14. The system of claim 13, wherein the pump radiation source comprises a first laser source and the probe radiation source comprises a second laser source.

15. The system of claim 13, further comprising a transducer disposed on the material and having a known thermal conductivity.

* * * * *